(12) United States Patent
Kim et al.

(10) Patent No.: US 10,038,867 B2
(45) Date of Patent: Jul. 31, 2018

(54) CERTIFICATION DEVICE AND METHOD USING IMAGE SENSOR

(71) Applicant: SAMSUNG ELECTRONICS CO., LTD., Suwon-si (KR)

(72) Inventors: Seung-chan Kim, Hwaseong-si (KR); Jae Hyuk Choi, Seoul (KR); Soo Chul Lim, Seoul (KR); Joon Ah Park, Seoul (KR); Du-sik Park, Suwon-si (KR); Jung Soon Shin, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/290,712

(22) Filed: Oct. 11, 2016

(65) Prior Publication Data

US 2017/0104949 A1   Apr. 13, 2017

(30) Foreign Application Priority Data

Oct. 12, 2015   (KR) ........................ 10-2015-0142416

(51) Int. Cl.
| | |
|---|---|
| *H04N 5/76* | (2006.01) |
| *H04N 5/378* | (2011.01) |
| *G06F 17/11* | (2006.01) |
| *G06F 17/16* | (2006.01) |
| *G06T 3/40* | (2006.01) |
| *H04L 9/32* | (2006.01) |
| *H04N 5/335* | (2011.01) |
| *H04N 5/357* | (2011.01) |
| *H04N 5/365* | (2011.01) |

(52) U.S. Cl.
CPC ............. *H04N 5/378* (2013.01); *G06F 17/11* (2013.01); *G06F 17/16* (2013.01); *G06T 3/40* (2013.01); *H04L 9/3278* (2013.01); *H04N 5/335* (2013.01); *H04N 5/357* (2013.01); *H04N 5/3658* (2013.01)

(58) Field of Classification Search
CPC ... G03B 2206/00; H04N 5/2178; H04N 5/217
USPC .................. 348/231.99, 231.2, 231.3, 231.6
See application file for complete search history.

(56) References Cited

U.S. PATENT DOCUMENTS

| | | | |
|---|---|---|---|
| 6,128,039 | A | 10/2000 | Chen et al. |
| 6,584,214 | B1 | 6/2003 | Pappu et al. |
| 7,129,973 | B2 | 10/2006 | Raynor |
| 7,603,029 | B2 | 10/2009 | Suh et al. |
| 7,663,670 | B1 | 2/2010 | Orboubadian |
| 8,441,391 | B2 | 5/2013 | Karr |

(Continued)

FOREIGN PATENT DOCUMENTS

| | | |
|---|---|---|
| EP | 1 263 208 A1 | 12/2002 |
| KR | 10-1169172 B1 | 8/2012 |

OTHER PUBLICATIONS

Kurt Rosenfeld, et al., "Sensor Physical Unclonable Functions," Proceedings from the IEEE International Symposium on Hardware-Oriented Security and Trust (HOST), Jun. 2010, pp. 1-6.

(Continued)

*Primary Examiner* — Kelly L Jerabek
(74) *Attorney, Agent, or Firm* — NSIP Law

(57) ABSTRACT

A mobile device method for certifying a mobile device includes: generating first fixed pattern noise (FPN) information based on column FPN of an image sensor included in the mobile device; and controlling the mobile device to perform a certification by using the first FPN information.

32 Claims, 24 Drawing Sheets

(56) References Cited

U.S. PATENT DOCUMENTS

| | | | | |
|---|---|---|---|---|
| 8,694,687 | B2 | 4/2014 | Hammouri et al. | |
| 2002/0191091 | A1* | 12/2002 | Raynor | H04N 1/32128 348/241 |
| 2007/0040915 | A1* | 2/2007 | Suzuki | H04N 5/3658 348/222.1 |
| 2012/0300988 | A1* | 11/2012 | Ivanov | G06K 9/00006 382/115 |
| 2013/0159195 | A1* | 6/2013 | Kirillin | G06Q 20/322 705/71 |
| 2016/0234449 | A1* | 8/2016 | Ishiwata | H01L 27/14605 |

OTHER PUBLICATIONS

Yuan Cao, et al., "CMOS Image Sensor Based Physical Unclonable Function for Smart Phone Security Applications," Proceedings from the 14$^{th}$ International Symposium on Integrated Circuits, Dec. 2014, pp. 392-395.

Yuan Cao, et al., "CMOS Image Sensor Based Physical Unclonable Function for Coherent Sensor-Level Authentication," IEEE Transactions on Circuits and Systems I: Regular Papers, vol. 62, No. 11, Nov. 2015, pp. 2629-2640.

European Search Report dated Feb. 22, 2017 in corresponding European Patent Application No. 16193549.9 (11 pages in English).

Deepu Roy, et al., "Comb Capacitor Structures for On-Chip Physical Unclonable Function," *IEEE Transactions on Semiconductor Manufacturing*, vol. 22, No. 1, Feb. 2009, pp. 96-102.

Yuan Cao, et al., "CMOS Image Sensor Based Physical Unclonable Function for Smart Phone Security Applications," *Proceedings from the 14$^{th}$ International Symposium on Integrated Ciruits (ISIC)*, Dec. 10-12, 2014, pp. 392-395.

Mitsubishi Electrics, "Mitsubishi Electric, Ritsumeikan University and JST Develop Security Solution for IoT Devices," *Business Wire, A Bershire Hathaway Company*, Feb. 4, 2015, (2 pages, in English).

Tim Brown, "Mitsubishi Electric develops security solution for IoT devices," *The Manufacturer*, Feb. 5, 2015, http://www.themanufacture.com/articles/mitsubishi-electric-develops-fingerprint-like-security-iot-devices/ (2 pages, in English).

\* cited by examiner

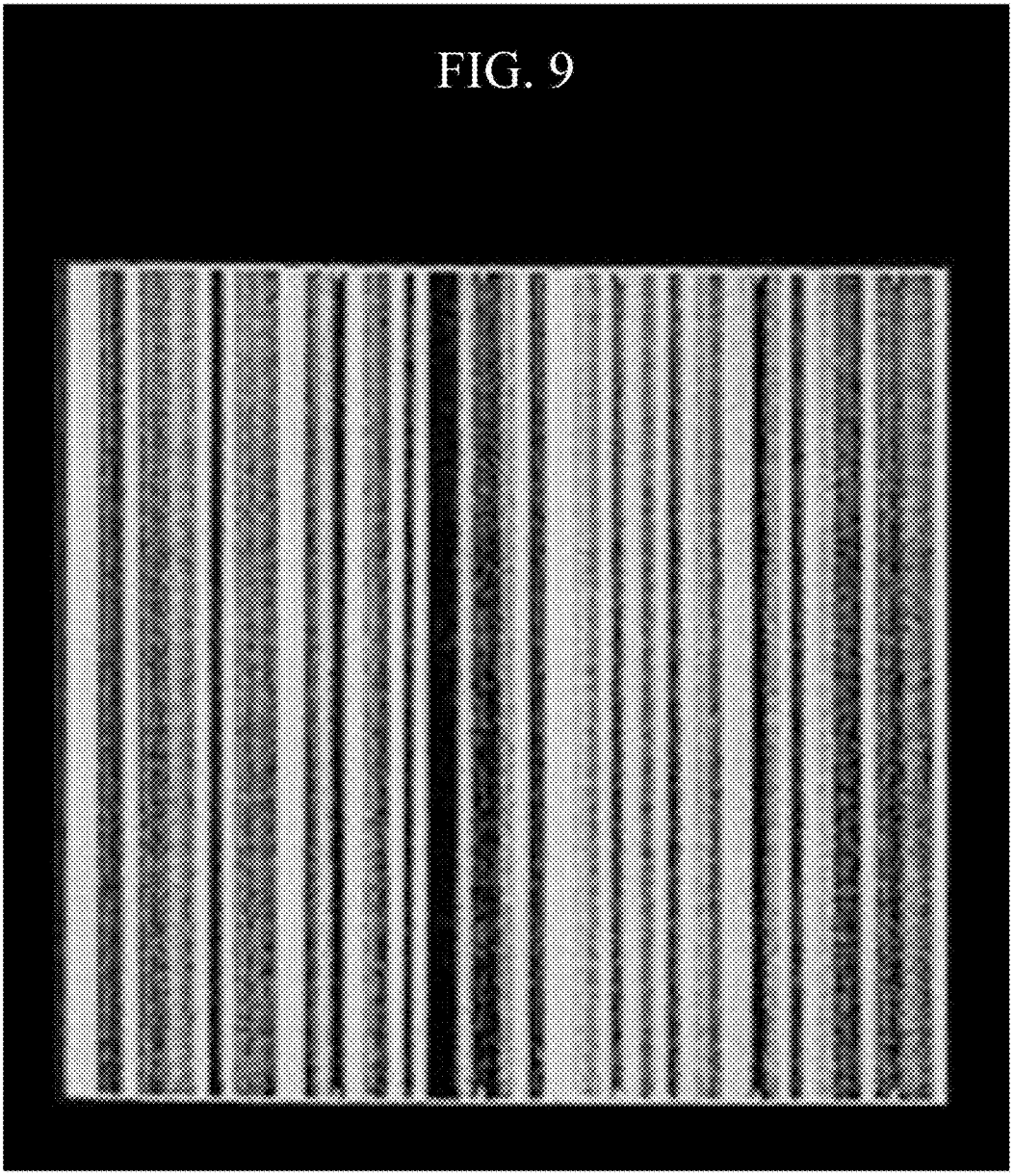

CERTIFICATION DEVICE AND METHOD USING IMAGE SENSOR

CROSS-REFERENCE TO RELATED APPLICATIONS

This application claims the benefit of Korean Patent Application No. 10-2015-0142416 filed in the Korean Intellectual Property Office on Oct. 12, 2015, the entire disclosure of which is incorporated herein by reference for all purposes.

BACKGROUND

1. Field

The following description relates to a method and device for performing a certification process using an image sensor of a device.

2. Description of Related Art

A unique identification (ID) may be assigned to a device and may be easily duplicated or changed. For example, subscriber identifying information such as an international mobile equipment identity (IMEI) or an international mobile subscriber identity (IMSI) represents a unique ID assigned to a mobile phone. Such a unique ID is accessible from an operating system (OS), and may be easily cloned, forged, or falsified to be maliciously used to tap the mobile phone or hack transmitted or received messages. Further, a media access control (MAC) address assigned when the device is connected to a network is intended to be set and fixed uniquely and forever in a global manner so that the MAC address can be used as the unique ID of the device. However, recently, the MAC addresses of devices can be easily modified using software programs, which is referred to as MAC spoofing. Therefore, computing technologies that are designed to use identification information randomly provided to the device after the device is manufactured may increase convenience of usage, but they fail because of a drawback of having difficulty in guaranteeing the uniqueness of the identity of the device.

The above information disclosed in this Background section is only for enhancement of understanding of the background of the disclosure and therefore it may contain information that does not represent prior art that is already known to a person of ordinary skill in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a mobile device method for certifying a mobile device includes: generating first fixed pattern noise (FPN) information based on column FPN of an image sensor included in the mobile device; and controlling the mobile device to perform a certification by using the first FPN information.

The generating of the first FPN information may include reading the column FPN from a double sampling circuit of the image sensor, and generating the first FPN information based on the column FPN.

The reading of the column FPN from the double sampling circuit may include reading a difference between a pixel voltage of pixels of the image sensor and a reference voltage of the double sampling circuit.

The generating of the first FPN information may include reading the column FPN from an ADC circuit of the image sensor, and generating the first FPN information based on the column FPN.

The generating of the first FPN information may include selecting at least one row from a matrix arrangement of pixels of the image sensor, reading column FPN of the at least one row from among the column FPN of the image sensor, and generating the first FPN information based on the column FPN of the at least one row.

The reading of the column FPN of the at least one row may include randomly selecting and reading column FPN from among the column FPN of the at least one row.

The generating of the first FPN information may include: downsampling a bit of the column FPN; and generating the first FPN information based on the downsampled bit.

The generating of the first FPN information may include: selecting part of bits of the column FPN; and generating the first FPN information based on the selected part of the bits.

The method may further include storing the first FPN information in a secure element of the mobile device or an external device.

The performing of the certification may include: generating second FPN information based on second column FPN of the image sensor; and comparing the first FPN information and the second FPN information.

The comparing of the first FPN information and the second FPN information may include: calculating a vector distance between a first vector of the first FPN information and a second vector of the second FPN information; and performing the certification based on the vector distance.

The storing of the first FPN information may include storing the first FPN information in the external device. The external device may be a server of a financial institution or a server of a settlement institution.

The generating of the first FPN information may include generating the first FPN information based on the column FPN of the image sensor and column FPN of a another image sensor from among a plurality of image sensors of the mobile device.

The controlling of the mobile device to perform the certification may include controlling the mobile device to encrypt data of the mobile device by using the first FPN information.

The performing of the certification may include: transmitting the first FPN information to a server of a financial institution or a server of a settlement institution; and controlling the mobile device, in response to a user of the mobile device accessing the server of the financial institution or the server of the settlement institution, to transmit an access time and a password generated based on the first FPN information to the server of the financial institution or the server of the settlement institution.

In another general aspect, a mobile device includes: at least one image sensor; and a trust zone configured to generate first fixed pattern noise (FPN) information based on column FPN of the at least one image sensor, and to perform a certification by using the first FPN information.

The mobile device may be configured to store the first FPN information in the trust zone.

The image sensor may include a double sampling circuit and pixels. The trust zone may be configured to generate the first FPN information by reading the column FPN from the double sampling circuit.

The mobile device may further include a controller configured to read a difference between a pixel voltage of the pixels and a reference voltage of the double sampling circuit.

The image sensor may include an analog to digital conversion (ADC) circuit and pixels. The trust zone may be configured to generate the first FPN information by reading the column FPN from the ADC circuit.

The mobile image sensor may include pixels arranged in a matrix. The controller may be configured to read, from at least one row in the matrix, column FPN from among the column FPN of the image sensor. The trust zone may be configured to generate the first FPN information based on the column FPN read from the at least one row.

The controller may be configured to randomly select and read the column FPN from the at least one row.

The controller may be configured to downsample a bit of the column FPN. The trust zone may be configured to generate the first FPN information based on the downsampled bit.

The controller may be configured to transmit part of bits of the column FPN to the trust zone. The trust zone may be configured to generate the first FPN information based on the selected part of the bits.

The trust zone may be configured to generate second FPN information based on second column FPN of the at least one image sensor, and to compare the first FPN information and the second FPN information.

The trust zone may be configured to calculate a vector distance between a first vector of the first FPN information and a second vector of the second FPN information, and to perform the certification based on the vector distance.

The mobile device may be configured to store the first FPN information in a server of a financial institution or a server of a settlement institution.

The trust zone may be configured to generate the first FPN information based on column FPN of a first image sensor from among the at least one image sensor and column FPN of a second image sensor from among the at least one image sensor.

The trust zone may be configured to encrypt data of the mobile device by using the first FPN information.

The mobile device may further include: a communicator configured to transmit the first FPN information to a server of a financial institution or a server of a settlement institution, wherein the trust zone is configured to generate a password based on an access time and the first FPN information in response to a user of the mobile device accessing the server of the financial institution or the server of the settlement institution, and to transmit the password to the server of the financial institute or the server of the settlement institution.

In another general aspect, a mobile device includes: an image sensor; and a trust zone configured to generate first fixed pattern noise (FPN) template based on column FPN of the image sensor, and to perform a certification by comparing the generated FPN template with a stored FPN template.

The mobile device may be configured to certify that the mobile device is not a cloned device in response to a determination of an acceptable sameness between the generated FPN template and the stored FPN template.

The stored FPN template may be stored in the trust zone or an external device.

The stored FPN template may be based on initial FPN of the image sensor obtained prior to the column FPN.

Other features and aspects will be apparent from the following detailed description, the drawings, and the claims.

BRIEF DESCRIPTION OF DRAWINGS

FIG. 9 shows an image of a column FPN, according to an embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The following description discloses components, such as an image sensor and a trust zone, of a device (e.g., a mobile device or PC) and processes performed using the components. The device may be controlled to cause the components to carry out the processes in order to perform a certification of the device.

Figure 1:
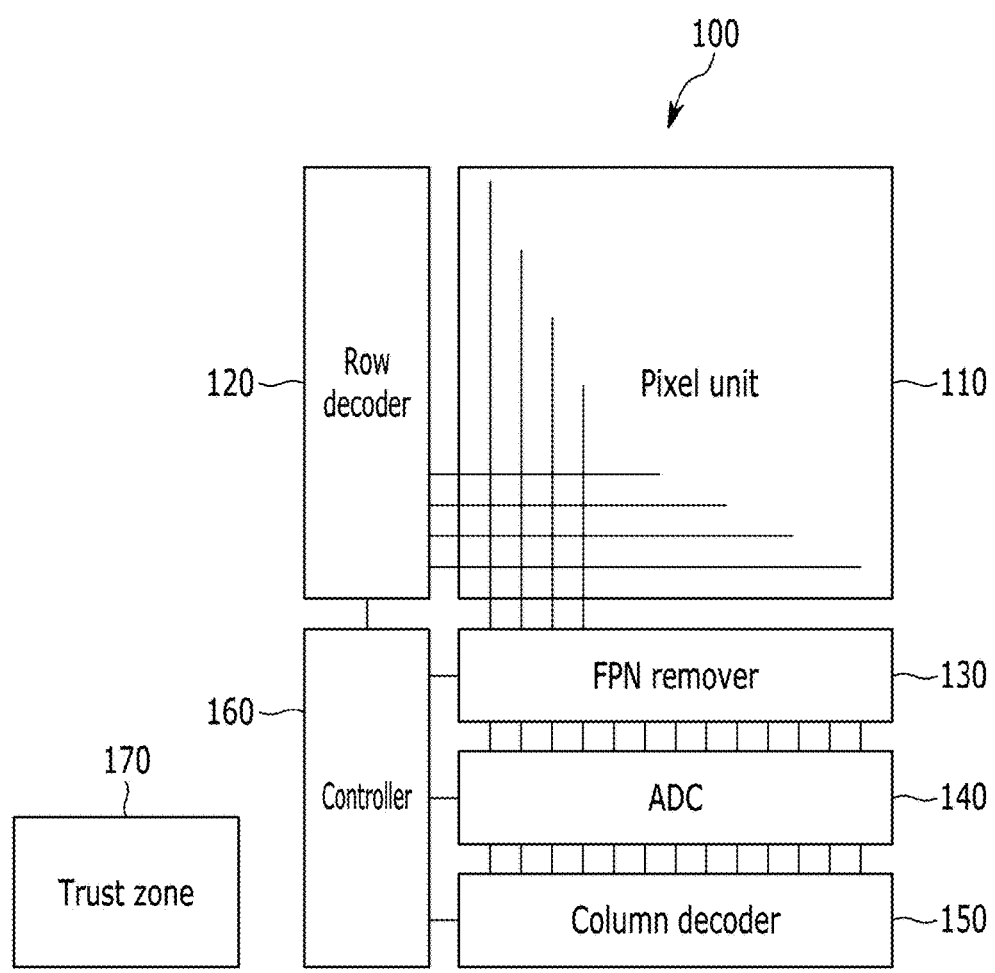
FIG. 1 shows an image sensor, according to an embodiment.

FIG. 1 shows an image sensor 100, according to an embodiment. Referring to FIG. 1, the image sensor 100 includes a pixel unit 110, a row decoder 120, a fixed pattern noise (FPN) remover 130, an analog to digital converter (ADC) 140, a column decoder 150, a controller 160 and a trust zone 170.

The pixel unit 110 includes a plurality of pixels, each pixel includes a photo diode (PD) and complementary metal oxide semiconductor (CMOS) transistors. Each pixel may convert light into a pixel voltage ($V_{PIX}$).

The row decoder applies a horizontal direction signal to the pixel unit 110.

The FPN remover 130 removes noise generated when the pixel is manufactured. For example, the FPN remover 130 may apply a correlated double sampling (CDS) technique for removing pixel FPN by using a signal voltage ($V_{SIG}$) and a pixel voltage ($V_{PIX}$) read from each pixel.

The ADC 140 converts an analog signal provided by the FPN remover 130 into a digital signal. The column decoder 150 reads the digital signal provided by the ADC 140 for respective columns of the pixel unit 110 and generates an image.

The controller 160 reads column FPN or pixel FPN from the FPN remover or the ADC 140. An operation of such a controller 160 will be described in greater detail later.

The trust zone 170 converts the column FPN or pixel FPN provided by the controller 160 into FPN information such as an FPN template or an FPN key. FPN information may therefore include at least one of an FPN template and an FPN key. An operation of such a trust zone 170 will be described in detail later.

Functions and operations of such a controller 160 and such a trust zone 170, and a method performed by the controller 160 and the trust zone 170 may be implemented by a processor. A memory may be connected to the processor to store various kinds of information or at least one program executed by the processor to perform the method.

Figure 2A:
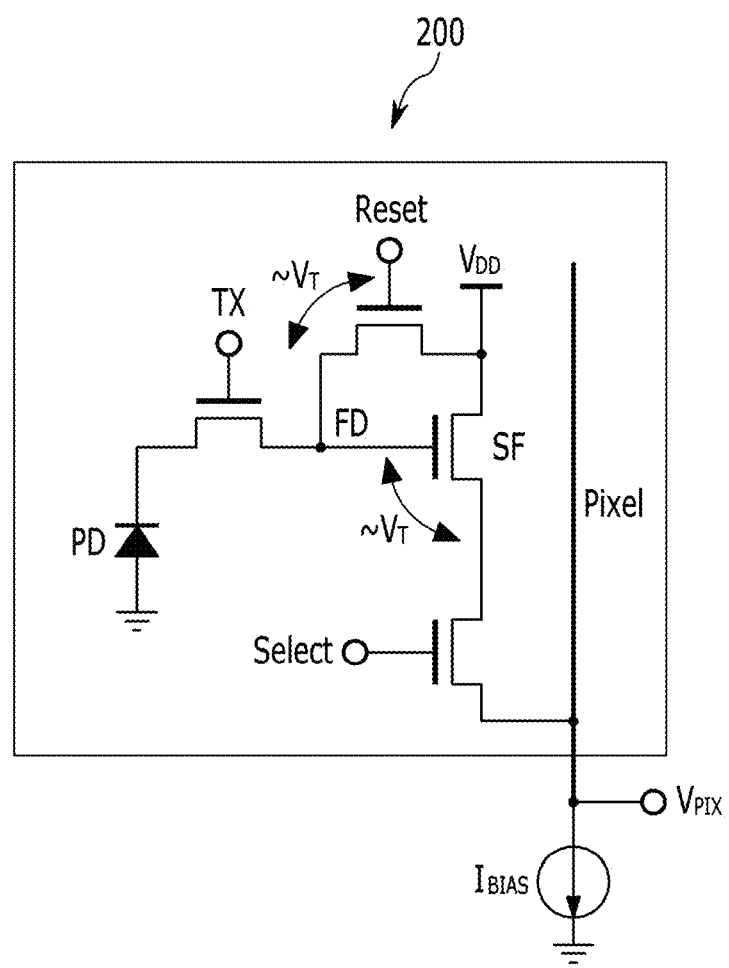
FIG. 2A shows a pixel circuit of an image sensor, according to an embodiment.
Figure 2B:
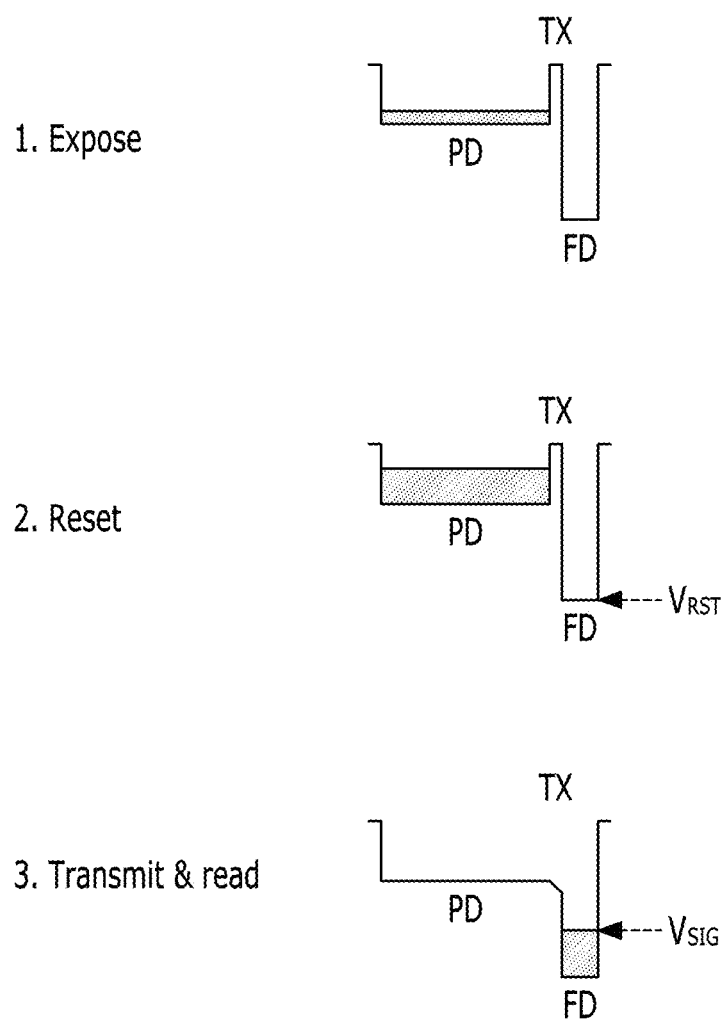
FIG. 2B shows an operation of a pixel circuit, according to an embodiment.

FIG. 2A shows a pixel circuit 200 of an image sensor, according to an embodiment. FIG. 2B shows an operation of the pixel circuit 200, according to an embodiment.

With reference to FIG. 2A and FIG. 2B, the pixel circuit 200 is exposed with light, a reset voltage is applied thereto, and an FD node is reset with a reset voltage ($V_{RST}$). The reset voltage may be $V_{DD}$ in the case of a hard reset (i.e., when a gate voltage of the reset transistor is $V_{DD}+V_T$), and it may be $V_{DD}-V_T$ in the case of a soft reset (i.e., when the gate voltage of the reset transistor is $V_{DD}$). $V_{DD}$ represents a power supply voltage, and $V_T$ indicates a threshold voltage of the transistor. With reference to the soft reset, a signal voltage ($V_{SIG}$) of the FD node may be expressed as Equation 1 according to charges provided by a photo diode.

$$V_{SIG} = V_{RST} - \frac{Q}{C_{FD}} = V_{DD} - V_T - \frac{Q}{C_{FD}} \qquad \text{(Equation 1)}$$

With respect to Equation 1, $Q/C_{FD}$ represents a voltage caused by the charges. When $V_{SIG}$ is read by a source follower (SF), a voltage drop is generated by a transistor of the source follower (SF) by $V_T$, so the pixel voltage ($V_{PIX}$) may be expressed as Equation 2 below.

$$V_{PIX} = V_{DD} - 2V_T - \frac{Q}{C_{FD}} \qquad \text{(Equation 2)}$$

With respect to Equation 2, $V_T$ is changeable for each pixel by a process variation so it may become an important factor of the pixel FPN. As described above, the signal voltage ($V_{SIG}$) and the reset voltage ($V_{RST}$) may be read from a CDS, and $V_T$ may be removed from the pixel voltage according to a process expressed in Equation 3 below.

$$V_{RST} - V_{SIG} = \frac{Q}{C_{FD}} \qquad \text{(Equation 3)}$$

Figure 3A:
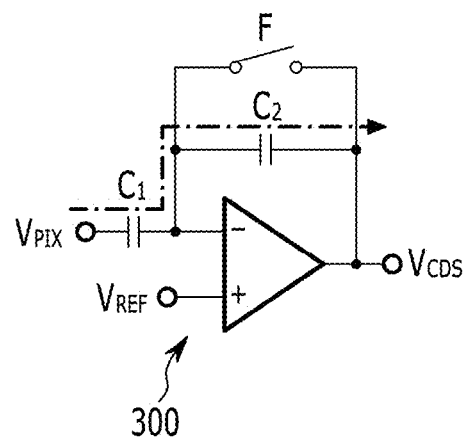
FIG. 3A shows a programmable gain amplifier (PGA) circuit, according to an embodiment.
Figure 3B:
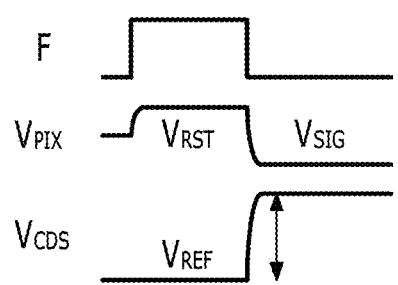
FIG. 3B shows a change of voltages of respective parts of the PGA circuit.

An example operation of the CDS will now be described with reference to FIG. 3. FIG. 3A shows a programmable gain amplifier (PGA) circuit 300, according to an embodiment. FIG. 3B shows a change of voltages of respective parts of the PGA circuit 300.

Referring to FIG. 3A, the programmable gain amplifier (PGA) circuit 300 may include an operational (OP) amplifier, two capacitors, and a switch, and may perform a CDS operation. Therefore, the PGA circuit 300 may be used for an example of the FPN remover 130.

When a switch is closed and a unity gain feedback is formed in the PGA circuit 300, $V_{RST}$ is sampled to $C_1$. When the switch is opened and $V_{SIG}$ is input, an output voltage $V_{PGA}$ of the PGA circuit 300 may be expressed as Equation 4 below (in the case of an idealistic OP amplifier).

$$V_{PGA} = V_{REF} + \frac{C_1}{C_2}(V_{RST} - V_{SIG}) \quad \text{(Equation 4)}$$

With respect to Equation 4, the signal may be amplified by a ratio of $C_1$ and $C_2$, so a programmable gain may be acquired by selectively controlling the value of $C_1$ or $C_2$, and $(C1/C2)(V_{RST}-V_{SIG})$ may be expressed as $\Delta V_{PGA}$. The output voltage $V_{PGA}$ includes "$V_{RST}-V-_{SIG}$" so an influence caused by the pixel FPN is removed.

In the case of a non-idealistic OP amplifier, an offset voltage ($V_{OFF}$) may occur because of a mismatch between the columns, such that the actual output voltage may be expressed as Equation 5 below.

$$V_{PGA}=V_{REF}+V_{OFF}+\Delta V_{PGA} \quad \text{(Equation 5)}$$

With respect to Equation 5, $V_{OFF}$ shows a different value for each column of the pixel unit 110 by the process variation and may become a major factor of the column FPN. The ADC 140 may perform a CDS to remove $V_{OFF}$. For example, the ADC 140 performs an analog to digital conversion on a differential signal of an output voltage (i.e., a first signal) in the case of a single gain feedback and an output voltage (i.e., a second signal) when the single gain feedback is released so that it may output a digital signal on the signal from which the column FPN is removed. A relationship among the first signal, the second signal and the differential signal is expressed, for example, in Equation 6 below.

$$V_{\text{differential signal}} = V_{\text{second signal}} - V_{\text{first signal}} = \quad \text{(Equation 6)}$$
$$(V_{REF} + V_{OFF} + \Delta V_{PGA}) - (V_{REF} + V_{OFF}) = \Delta V_{PGA}$$

That is, referring to Equation 6, the ADC 140 may output the digital signal of $\Delta V_{PGA}$. A comparator circuit may be used for the ADC 140 and an offset voltage ($V_{OFF2}$) may be generated by the comparator so the ADC 140 may perform an auto zeroing operation for removing the offset voltage from the digital output of the image sensor. When the ADC 140 does not perform the CDS and the auto zeroing operation, the digital output of the image sensor may include an offset voltage ($V_{OFF1}$) of the PGA circuit 300 and an offset voltage ($V_{OFF2}$) of the comparator. An example method for acquiring column FPN from an image sensor will now be described with reference to FIG. 4 to FIG. 8.

Figure 4:
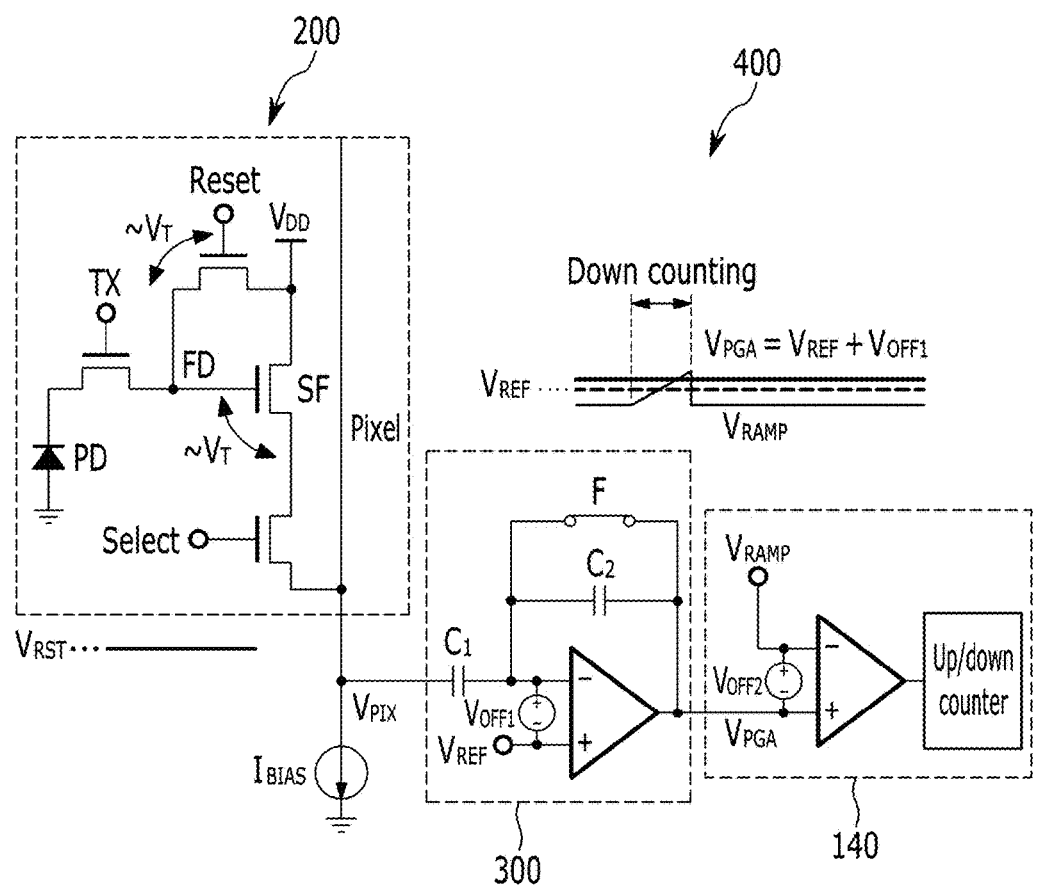
FIG. 4 shows a digital correlated double sampling (CDS) circuit and a method for acquiring a column fixed pattern noise (FPN), according to an embodiment.

FIG. 4 shows a digital CDS circuit 400 and a method for acquiring a column FPN, according to an embodiment. Referring to FIG. 4, when a single gain feedback is formed, an output voltage $V_{PGA}$ of the PGA circuit 300 becomes $V_{REF}+V_{OFF1}$. The comparator of the ADC 140 compares $V_{PGA}$ and a ramp signal $V_{RAMP}$, an up/down counter of the ADC 140 down counts a comparison result, and the counter stops when respective inputs of the comparator cross each other. The output voltage $V_{PGA}$ of the PGA circuit 300 when the single gain feedback is released becomes $V_{REF}+V_{OFF1}+\Delta V_{PGA}$. The comparator of the ADC 140 compares $V_{PGA}$ and $V_{RAMP}$, the up/down counter of the ADC 140 up counts the comparison result, and the counter stops when respective inputs of the comparator cross each other. Therefore, $V_{OFF1}$ and $V_{OFF2}$ generated by the PGA 300 circuit and the ADC 140 may be attenuated by the up/down counting of the ADC 140 so the ADC 140 may acquire an effect of the CDS and auto zeroing operation. Here, the controller 160 may sense $V_{OFF1}$ of the PGA circuit 300 or $V_{OFF2}$ of the comparator to acquire the column FPN.

When the image sensor includes the PGA circuit 300, the controller 160 may sense $V_{OFF1}$ of the PGA circuit 300 to acquire the column FPN. The controller 160 closes a feedback switch of the PGA circuit 300 to form a single gain feedback, and fixes the output $V_{PGA}$ of the PGA circuit 300 as $V_{REF}+V_{OFF1}$. The ADC 140 compares $V_{PGA}$ and $V_{RAMP}$ and performs a down counting. A digital output of the ADC 140 represents a digital code that corresponds to $V_{REF}+V_{OFF1}+V_{OFF2}$, and the controller 160 may acquire the column FPN based upon $V_{OFF1}+V_{OFF2}$ caused by the process variation.

When an image sensor according to another embodiment does not include the PGA circuit 300, the controller 160 may sense the threshold voltage $V_T$ of the pixel transistor and the offset voltage $V_{OFF2}$ of the ADC 140 to acquire the column FPN. First, the controller 160 applies a voltage (i.e., reset (RST) enable) to an RST gate of a pixel to fix an output voltage $V_{PIX}$ of the pixel as expressed in Equation 7.

$$V_{PIX}=V_{RST}-V_T=V_{DD}-2V_T \quad \text{(Equation 7)}$$

When the up/down counter of the ADC 140 performs a down counting, the digital output of the ADC 140 becomes a digital code that corresponds to $V_{DD}-2V_T+V_{OFF2}$. The controller 160 according to an embodiment without the PGA circuit 300 may acquire the column FPN based on $-2V_T+V_{OFF2}$ caused by the process variation.

Figure 5A:
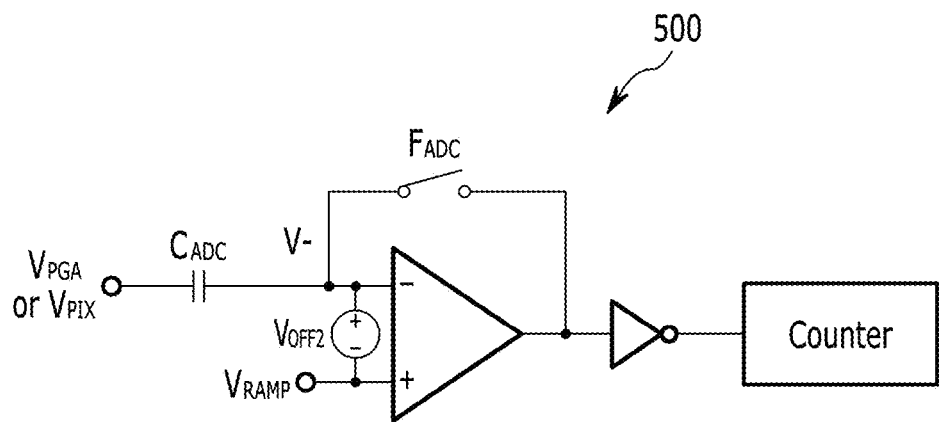
FIG. 5A shows an analog CDS circuit, according to an embodiment.
Figure 5B:
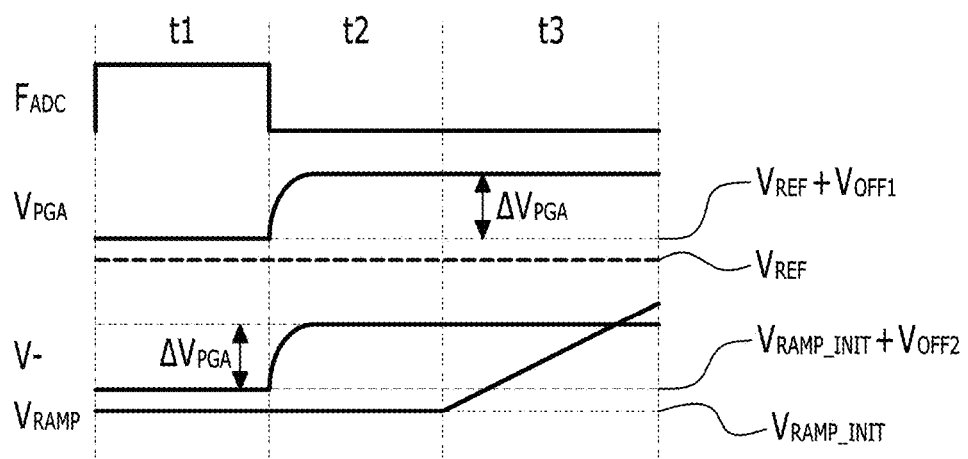
FIG. 5B shows a timing diagram of an operation of the analog CDS circuit of FIG. 5A, according to an embodiment.

FIG. 5A shows an analog CDS circuit 500, according to an embodiment. FIG. 5B shows a timing diagram of an operation of the analog CDS circuit 500, according to an embodiment. The analog CDS circuit 500 may store $V_{OFF2}$ into $C_{ADC}$, and may use the stored $V_{OFF2}$ when the comparator is operated. Referring to FIG. 5A and FIG. 5B, at a timing $t_1$, a single gain feedback to the comparator of the ADC 140 is formed, and $V_{PGA}$ ($=V_{RST}+V_{OFF1}$) is sampled to $C_{ADC}$. An input voltage $V_-$ at an inverting input terminal of the comparator becomes $V_{RAMP\_INIT}+V_{OFF2}$. At a timing $t_2$, when the feedback of the comparator is released and $V_{PGA}$ ($=V_{REF}+V_{OFF1}+\Delta V_{PGA}$) is input, $V_-$ becomes as expressed in Equation 8 below.

$$V_-=V_{RAMP\_INIT}+V_{OFF2}+\Delta V_{PGA} \quad \text{(Equation 8)}$$

At a timing $t_3$, the time when the inputs cross each other when $V_-$ is compared with $V_{RAMP}$ is a time when $V_{RAMP}+V_{OFF2}$ becomes $V_-$ as expressed in Equation 9, so $V_{OFF2}$ may be deleted from the digital output of the ADC 140.

$$V_{RAMP\_INIT}+V_{OFF2}+\Delta V_{PGA}=V_{RAMP}+V_{OFF2}$$

$$\therefore V_{RAMP}=V_{RAMP\_INIT}+\Delta V_{PGA} \quad \text{(Equation 9)}$$

That is, regarding the analog CDS circuit 500, the offset voltage $V_{OFF2}$ of the comparator is stored in $C_{ADC}$, is deleted when the input voltages of the comparator are compared, and is not applied to the digital output of the ADC 140. As a result, it is difficult to acquire the column FPN. Therefore, a method for applying an offset voltage caused by a process variation to a digital output of the ADC 140 by using a switch will now be described with reference to FIGS. 6A, 6B and FIG. 7.

Figure 6A:
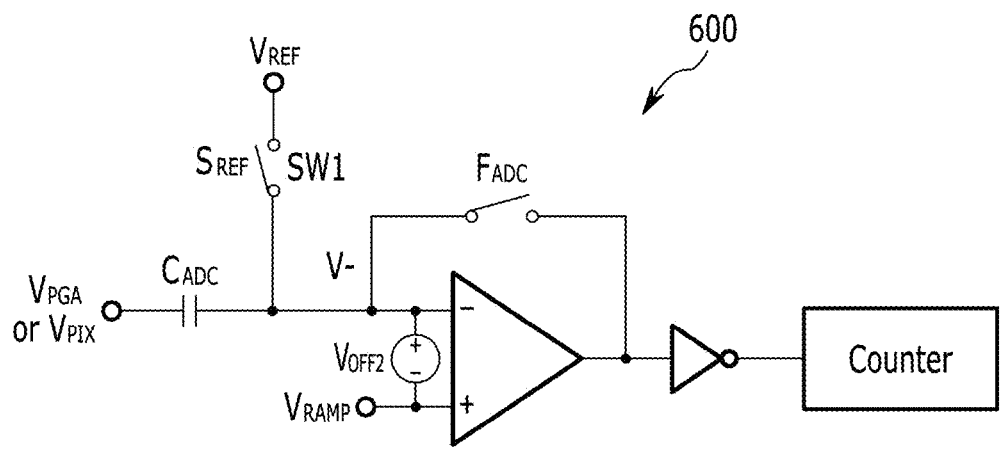
FIG. 6A shows an analog CDS circuit for sensing $V_{OFF2}$, according to an embodiment.
Figure 6B:
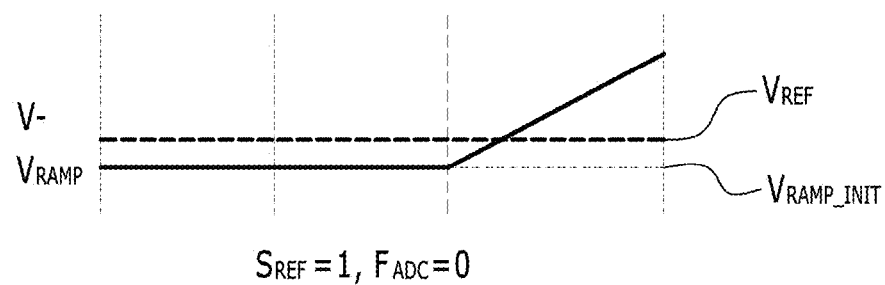
FIG. 6B shows a timing diagram of an operation of the analog CDS circuit of FIG. 6A, according to an embodiment.

FIG. 6A shows an analog CDS circuit 600 for sensing $V_{OFF2}$, according to an embodiment. FIG. 6B shows a timing diagram of an operation of the analog CDS circuit 600, according to an embodiment.

Referring to FIG. 6A, the analog CDS circuit 600 includes a switch between an inverting input terminal of a comparator and $V_{REF}$. In this case, a single gain feedback path to the comparator is not formed. $V_{PGA}$ (or $V_{PIX}$) is intercepted by $C_{ADC}$, the switch provided between an inverting input terminal and $V_{REF}$ is closed so $V_{REF}$ may be forcibly applied to the inverting input terminal of the comparator. Referring to FIG. 6B, when $V_{REF}$ is applied to V−, the ADC 140 may generate an output signal when V_ becomes equal to $V_{RAMP}+V_{OFF2}$. That is, the digital output of the ADC 140 becomes a digital code that corresponds to $V_{REF}-V_{OFF2}$, and the column FPN may be acquired by using $V_{OFF2}$ caused by the process variation.

Figure 7A:
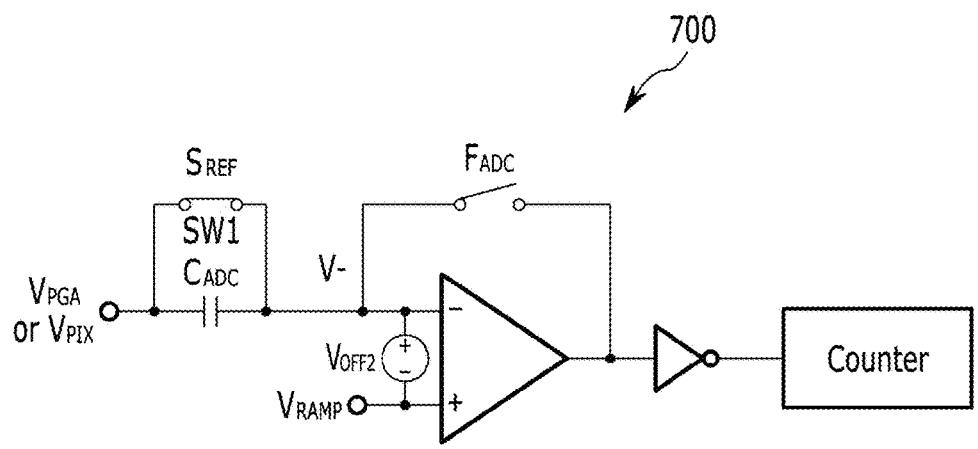
FIG. 7A shows an analog CDS circuit for sensing $V_{OFF2}$, according to another embodiment.
Figure 7B:
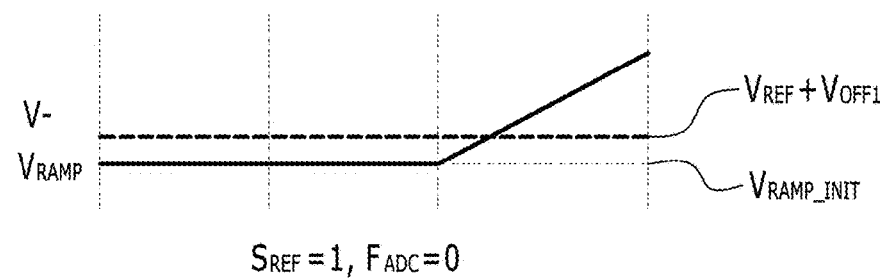
FIG. 7B shows a timing diagram of an operation of the analog CDS circuit of FIG. 7A, according to an embodiment.

FIG. 7A shows an analog CDS circuit 700 for sensing $V_{OFF2}$, according to another embodiment. FIG. 7B shows a timing diagram of an operation of the analog CDS circuit 700.

Referring to FIG. 7A, the analog CDS circuit 700 includes a switch between an inverting input terminal of a comparator and $V_{PIX}$ (or $V_{PGA}$), and a feedback path of the comparator for sensing $V_{OFF2}$ is not formed. In this case, when the switch provided between the inverting input terminal and $V_{PIX}$ is closed, $V_{PGA}$ (or $V_{PIX}$) is applied to V_ (removing an influence of $C_{ADC}$), and a digital output corresponding to the digital code of the ADC 140 may be determined according to Equation 10 below.

$$V_- = V_{PGA} = V_{RAMP} + V_{OFF2}$$

$$V_{REF} + V_{OFF1} = V_{RAMP} + V_{OFF2}$$

$$\therefore V_{RAMP} = V_{REF} + V_{OFF1} - V_{OFF2} \quad \text{(Equation 10)}$$

With respect to Equation 10, in the case of the analog CDS circuit 700, $V_{RAMP}$ and $V_{PGA}$ (or $V_{PIX}$) may be directly compared in a manner similar to that described above the digital CDS circuit 400.

Figure 8A:
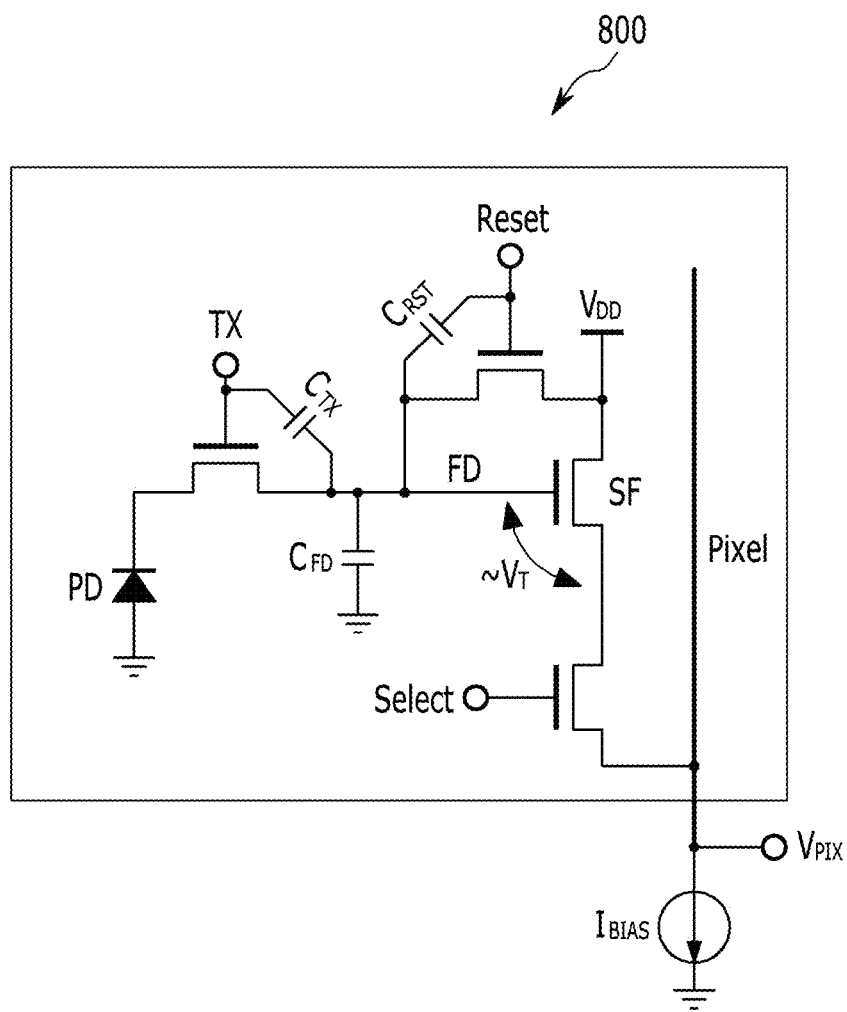
FIG. 8A shows a unit pixel including a pixel capacitor, according to an embodiment.
Figure 8B:
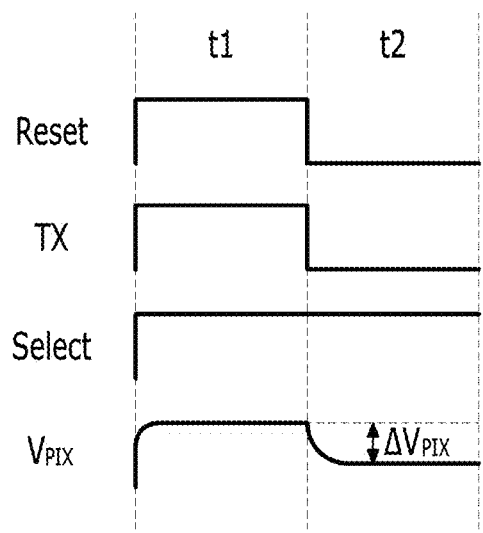
FIG. 8B shows a timing diagram for acquiring a column FPN using a processing deviation of the pixel capacitor of FIG. 8A, according to an embodiment.

FIG. 8A shows a pixel circuit 800 including a pixel capacitor, according to an embodiment. FIG. 8B shows a timing diagram for acquiring a column FPN using a processing deviation of the pixel capacitor, according to an embodiment.

Referring to FIG. 8A, a pixel in the pixel circuit 800, according to an embodiment, includes parasitic capacitance $C_{TX}$ and $C_{RST}$ of the transistor and parasitic capacitance $C_{FD}$ of an FD node. Referring to FIG. 8A and FIG. 8B, at a timing $t_1$, when a reset voltage is applied to the FD node, an output voltage $V_{PIX}$ of the pixel may be determined as expressed in Equation 11 below.

$$V_{PIX} = V_{DD} - 2V_T \quad \text{(Equation 11)}$$

At a timing $t_2$, when the reset voltage $V_{RST}$ and a transmission voltage $V_{TX}$ are changed to 0, the $V_{PIX}$ changes by $\Delta V_{PIX}$ by a clock feedthrough, and $\Delta V_{PIX}$ is expressed in Equation 12 below.

$$\Delta V_{PIX} = \frac{C_{TX} + C_{RST}}{C_{FD} + C_{TX} + C_{RST}} V_{DD} \quad \text{(Equation 12)}$$

Therefore, an output $V_{DD}-2V_T$ at the timing $t_1$ and an output $V_{DD}-2V_T-\Delta V_{PIX}$ at the timing $t_2$ are sequentially received and an analog CDS is performed. An output of the ADC 140 becomes a digital code that corresponds to $\Delta V_{PIX}$, and the column FPN caused by the process variation of the capacitance $C_{TX}$, $C_{RST}$ and $C_{FD}$ may be acquired.

FIG. 9 shows an image of a column FPN, according to an embodiment.

Referring to FIG. 9, the column FPN changes along a horizontal axis (i.e., row) of an image. Noise minutely changes on a vertical axis but does not have a meaningful value, so the change of the column FPN of each row may be used in an embodiment.

Figure 10:
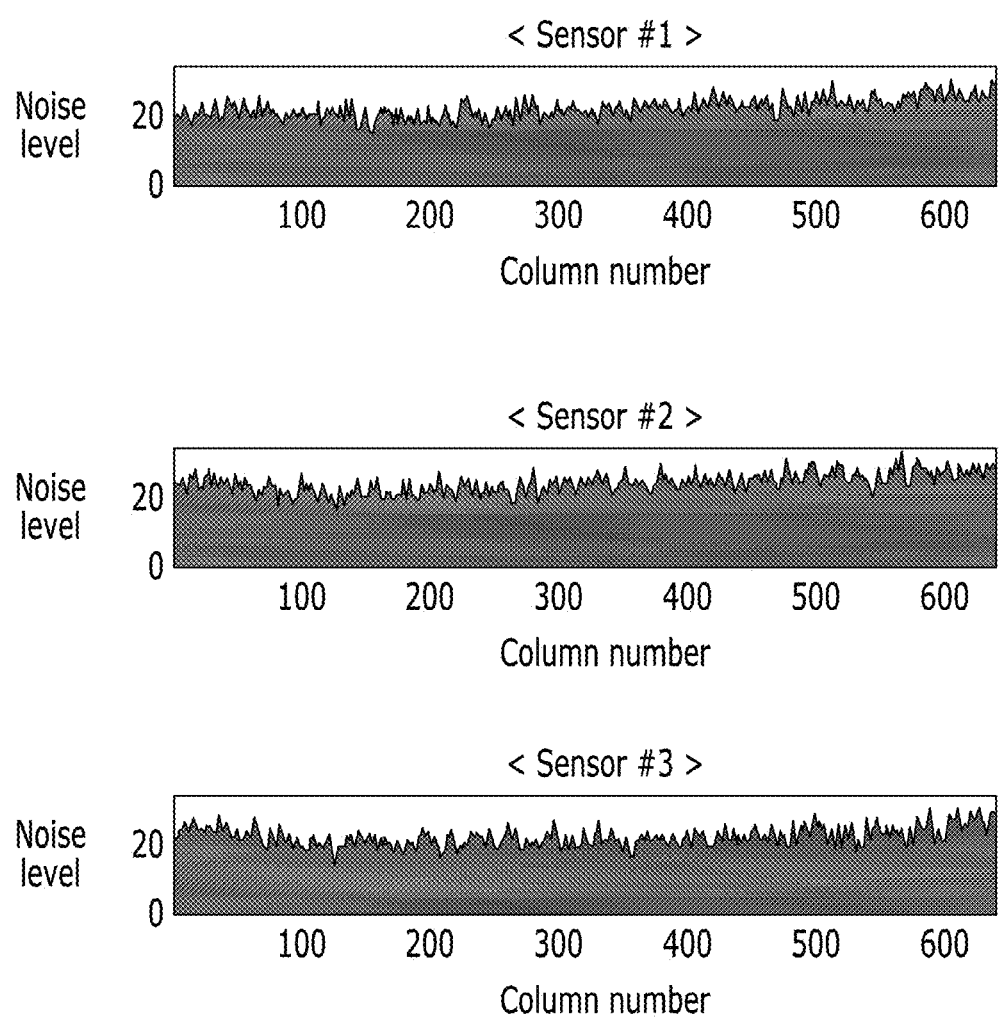
FIG. 10 shows a column FPN of a first row of three different image sensors, according to an embodiment.

FIG. 10 shows a column FPN of a first row of three different image sensors, according to an embodiment. Referring to FIG. 10, three graphs respectively show column FPN on a first row of each image sensor. That is, the horizontal axis of each graph represents a column number of each image sensor, the vertical axis indicates a noise level of each column, so changes of noise from the column 0 to the column 639 on a first row of each image sensor. All of the column FPNs of the image sensor have different patterns on the same row. Therefore, a characteristic that FPN (column FPN and pixel FPN) of the image sensor is unique for each image sensor may be used in an embodiment. The FPN of the image sensor, according to an embodiment, may slightly change according to a temperature, and an FPN pattern may be set to be resistant to a change due to a variation in temperature in consideration of a change tendency of FPN caused by an increase/decrease of the temperature. For example, when a DC component of a measured voltage has a tendency to decrease as the temperature increases, the FPN may be acquired by considering the above-noted voltage decrease tendency in the case of certifying the device through column FPN. A method for generating an ID of a device using column FPN will now be described with reference to FIG. 11.

Figure 11:
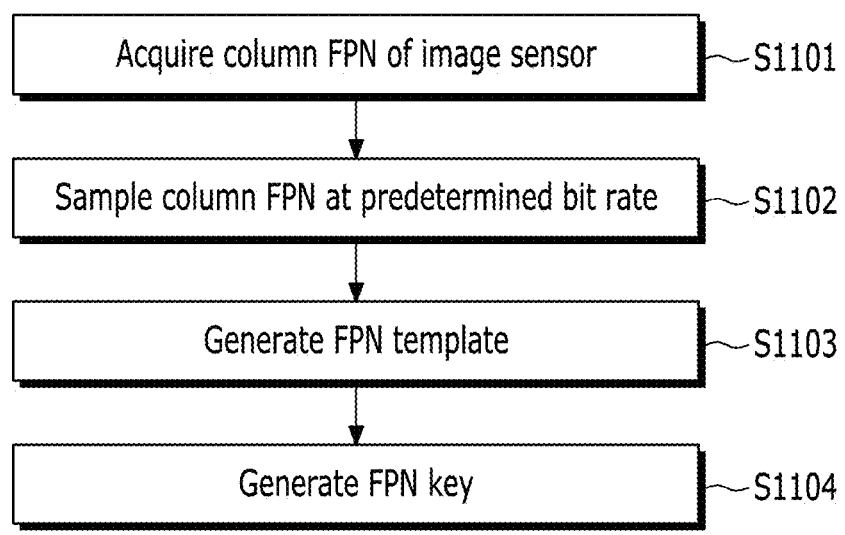
FIG. 11 shows a flowchart of a method for generating an ID of a device based on an FPN, according to an embodiment.
Figure 12:
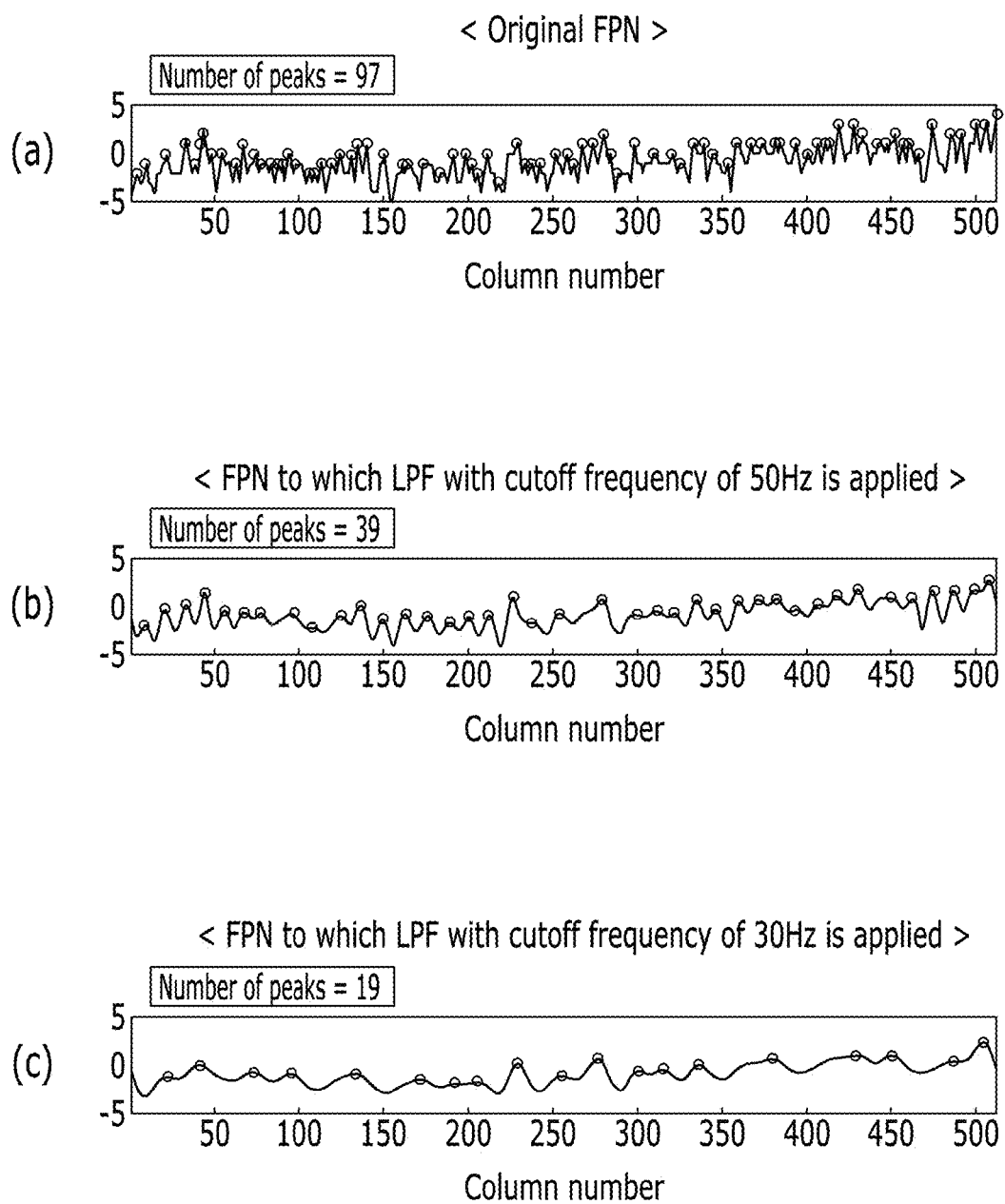
FIG. 12 shows a FPN and a peak of the FPN, according to an embodiment.

FIG. 11 shows a flowchart of a method for generating an ID of a device based on an FPN according to an embodiment and FIG. 12 shows FPN and a peak of the FPN according to an embodiment.

When an initial image sensor is manufactured, a controller, such as the controller 160 (FIG. 1), of the image sensor acquires column FPN of the manufactured image sensor in operation S1101. The acquired column FPN may be used as the ID of the device, and when acquired, it may be stored in a trust zone (e.g., TrustZone) included in the device or an external server of the device. The column FPN is sampled at a determined bit rate in the trust zone of the device in operation S1102. A bit number of the sampled column FPN may be determined according to a bit rate and a changing degree of the pattern. For example, when the respective rows of the image sensor include 640 pixels and the column FPN of the respective pixels is sampled by 8 bits, the sampled bit number of the column FPN for one row may be 5,120 (640 pixels×8 bits/pixel=5,120 bits). The column FPN may be downsampled to reduce the bit number of the FPN template. For example, when the downsampling rate is 1/2, the bit number of the FPN may be reduced to 2,560 from 5,120 after its sampling. In another way, the column FPN may be sampled for the noise level with a predetermined range in consideration of the changing degree of the pattern of the column FPN. For example, when the pattern changing degree of the column FPN is provided within the noise level of 15 to 35, the column FPN may be sampled at the bit rate that is lower than 8 bits. For example, when the column FPN is sampled by 6 bits, the bit number of the sampled FPN may be 3,840 (640 pixel×6 bits/pixel=3,840 bits).

In operation S1103, an FPN template ($T_0$) is generated based upon the sampled FPN bits in the trust zone of the device. A mean value of the column FPN of the image sensor may be determined with the FPN template (e.g., the ID of the device). For example, when receiving a request for measuring the column FPN of the image sensor, the controller 160 measures the column FPN of the image sensor n-numbered times and transmits n-numbered column FPN to the trust zone of the device. The trust zone of the device may generate an FPN template ($T_O$) by calculating the mean value of the sampled FPN bits based on n-numbered column FPN. The trust zone of the device may remove random noise from n-numbered column FPN before the sampling process. The random noise may be removed by calculating the mean value of the FPN of n rows rather than measuring one row n times. For example, when a size of the image sensor is 640×480, one mean column FPN may be acquired by calculating the mean value of respective column FPN corresponding to 480 rows. That is, random noise is removed from the FPN when the FPN is acquired so reliability of verifying the FPN may be increased.

In operation S1104, the trust zone may generate an FPN key ($k_O$) based on the sampled FPN bit. The FPN key may be expressed as a one-dimensional vector and may be generated through encryption on the FPN bit. The generated FPN key may be used to encode/decode a digital file generated by the device for the purpose of a digital rights management (DRM). The FPN template and the FPN key generated according to an embodiment may be stored in the trust zone of the device.

Regarding FIG. 12, graph (a) shows a graph for indicating original FPN and a peak of the original FPN, graph (b) shows a graph for indicating FPN to which a low-pass filter (LPF) with a cutoff frequency of 50 Hz is applied and a peak of the filtered FPN, and graph (c) shows a graph for indicating FPN to which a low-pass filter (LPF) with a cutoff frequency of 30 Hz is applied and a peak of the filtered FPN. Regarding each of the respective graphs of FIG. 12, a horizontal axis is a column number of an image sensor, and a vertical axis is a relative size of the FPN peak of each column. The number of peaks in the original FPN is 97, the number of peaks of the FPN to which the low-pass filter with the cutoff frequency 50 Hz is applied is reduced to be 39, and the number of peaks of the FPN to which the low-pass filter with the cutoff frequency 50 Hz is applied is reduced to be 19.

That is, according to an embodiment, in order to reduce the bit number of the FPN template and generate the FPN template to be resistant to errors, a method for detecting the peaks in the FPN and sampling the peaks may be used, and a method for filtering FPN may be used. More specifically, the peak detecting method and the filtering method may be simultaneously used. FIG. 12 shows a case in which the low-pass filter is applied to the column FPN, and a high-pass filter (HPF) or a band-pass filter (BPF) may be also applied to the FPN filtering. When the FPN is filtered as described above, part of FPN information may be lost but the FPN information may be compressed with an appropriate level of certification so the number of FPN bits may be reduced and an amount of calculation required for processing the certification may be reduced.

Figure 13:
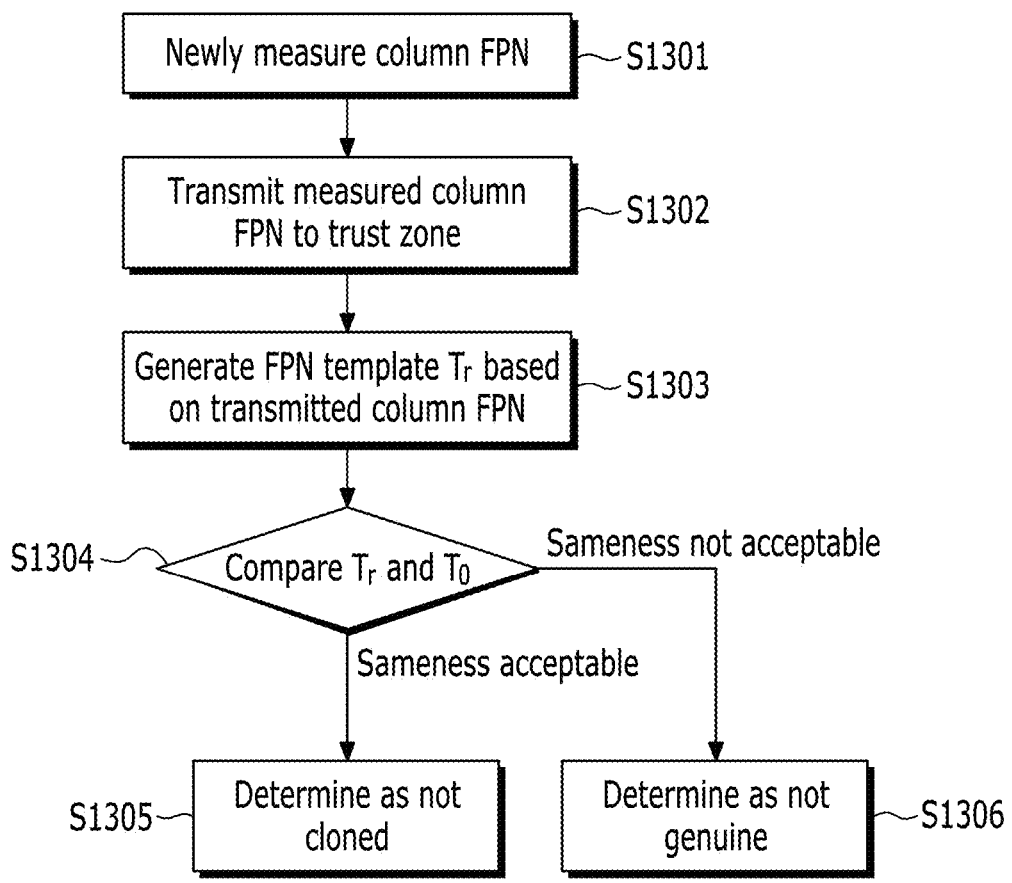
FIG. 13 shows a flowchart of a method for certifying a device using an FPN template, according to an embodiment.
Figure 14:
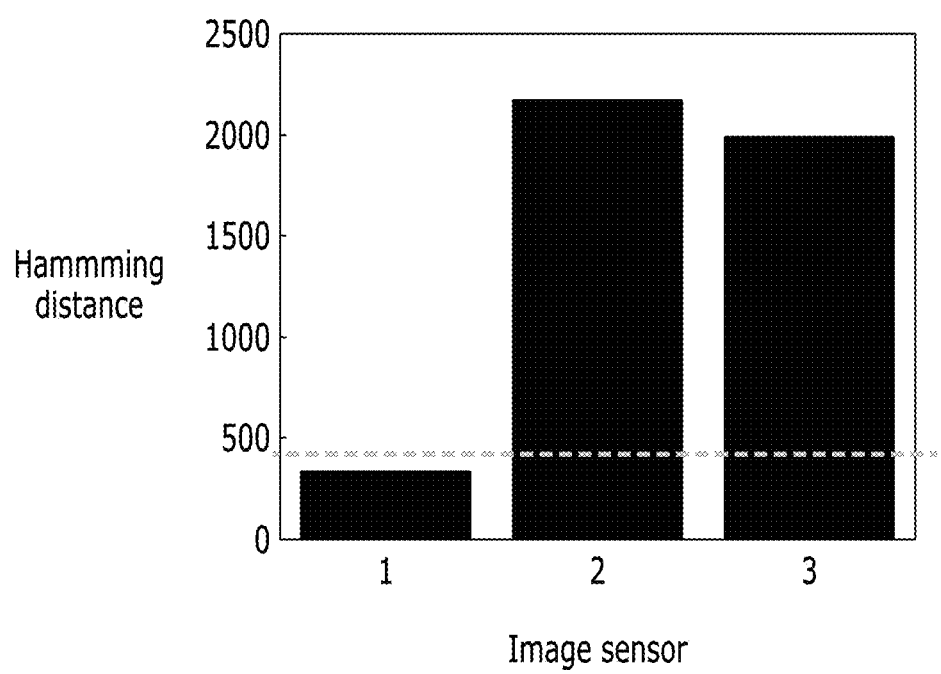
FIG. 14 shows a Hamming distance graph for applying a column FPN, according to an embodiment.
Figure 15:
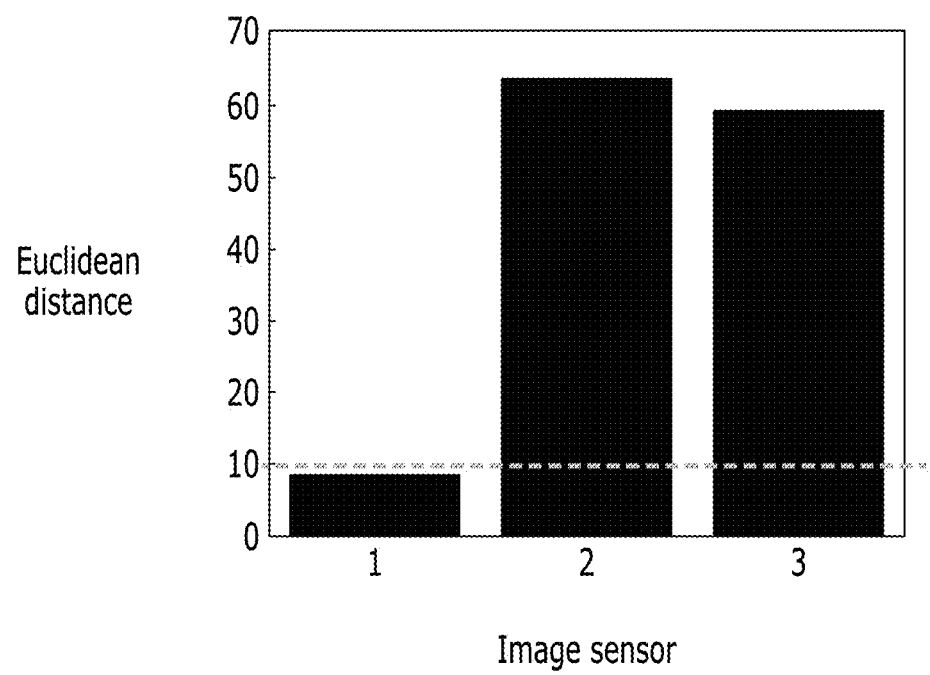
FIG. 15 shows a Euclidean distance graph for applying a column FPN, according to an embodiment.

FIG. 13 shows a flowchart of a method for certifying a device using an FPN template, according to an embodiment. FIG. 14 shows a Hamming distance graph for applying a column FPN, according to an embodiment. FIG. 15 shows a Euclidean distance graph for applying a column FPN, according to an embodiment.

Referring to FIG. 13, in operation S1301, when the device enters into a certification mode, a controller, such as the controller 160 (FIG. 1), of the image sensor newly measures the column FPN of the image sensor according to a request. In operation S1302, the controller 160 transmits the measured column FPN to the trust zone. In operation S1303, the trust zone of the device generates an FPN template ($T_r$) based on the column FPN transmitted at the time of certification. In operation S1304, the trust zone compares the generated FPN template ($T_r$) with the stored FPN template ($T_O$) based on the measured column FPN. Random noise may be removed from the initially acquired FPN when the stored FPN template is generated, thereby providing high verification reliability.

A method for measuring a vector distance may be used for comparison of $T_r$ and $T_O$. For example, in operation S1305, when a vector distance between $T_r$ and $T_O$ is less than a predetermined threshold value ($T_{Th}$), the sameness of $T_r$ and $T_O$ may be acceptable, and the device having $T_r$ that is determined to have an acceptable sameness to $T_O$ may be determined to be not cloned. In operation S1306, when the sameness between $T_r$ and $T_O$ is not acceptable, the device having the measured FPN template may be determined to be cloned. A method for determining the sameness of $T_r$ and $T_O$, according to an embodiment, will now be described with reference to FIG. 14 and FIG. 15.

FIG. 14 shows a comparison result of $T_r$ and $T_O$ according to a method for measuring a Hamming distance. FIG. 15 shows a comparison result of $T_r$ and $T_O$ according to a method for measuring a Euclidean distance.

Referring to FIG. 14, the Hamming distance between $T_r$ of the image sensor and $T_O$ stored in the trust zone is shown. The horizontal axis represents a number of each image sensor, and the vertical axis indicates a Hamming distance value. When the threshold value is determined to be 500 according to the method for measuring a Hamming distance, the first sensor having the Hamming distance of $T_r$ from $T_O$ where $T_r$ is less than the threshold value may be determined to be not cloned. On the contrary, the sensors 2 and 3 having the Hamming distance of $T_r$ from $T_O$ where $T_r$ is greater than the threshold value may be determined to be not genuine.

Referring to FIG. 15, the Euclidean distance between $T_r$ of the image sensor and $T_O$ stored in the trust zone is shown. The horizontal axis represents the number of each image sensor, and the vertical axis represents the Euclidean distance value. When the threshold value caused by the method for measuring a Euclidean distance is determined to be 40, the sensor 1 having the Euclidean distance of $T_r$ from $T_O$ where $T_r$ is less than the threshold value may be determined to be not cloned. The sensors 2 and 3 having the Euclidean distance of $T_r$ from $T_O$ where $T_r$ is greater than the threshold value may fail in certification.

Figure 16:
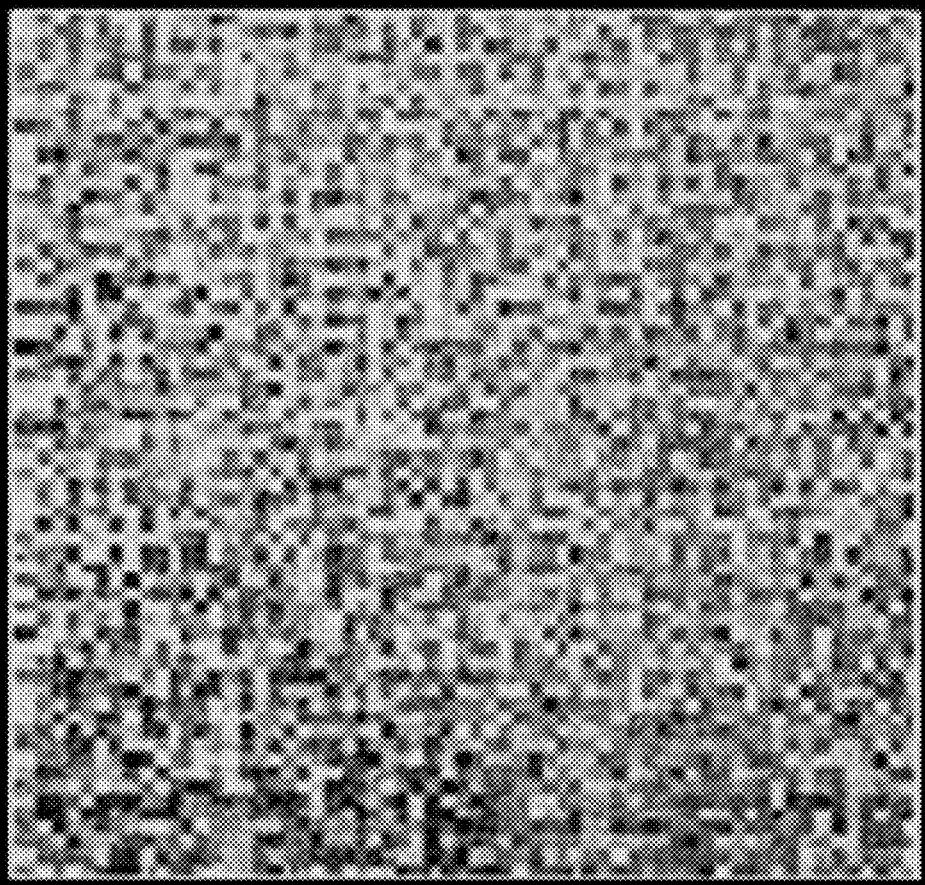
FIG. 16 shows an image of a pixel FPN, according to an embodiment.

FIG. 16 shows an image of a pixel FPN, according to an embodiment. Pixel FPN represents noise occurring for each pixel of the pixel unit 110 (FIG. 1), for example. Referring to FIG. 16, bits of the pixel FPN may be arranged in a two-dimensional manner so that the pixel FPN includes further information to be used as a unique value compared to the column FPN. Regarding the method for generating an ID of a device, according to an embodiment, the pixel FPN may be used based upon the vector acquired from one row or column or based upon a two-dimensional matrix.

When the pixel FPN is used based upon the vector, the pixel FPN of the image sensor is acquired from a controller, such as the controller 160, of the image sensor, and is transmitted to the trust zone of the device. The trust zone selects one row or one column from among the two-dimensional arrangement of the pixel FPN and generates an FPN template based upon the FPN of the selected row or column. For example, when a column is selected from the pixel FPN of the image sensor with 640×480 pixels, the column includes 480 pixels so the number of sampled bits is 3,840 when they are sampled by 8 bits. In this case, a down sampling method may be used to reduce the bit number of the FPN template. For example, when the down sampling rate is 1/2, the number of bits of the FPN template may be 1,920. Further, the column FPN may be sampled for the noise level predetermined in consideration of a pattern change width of the column selected from the pixel FPN. For example, when the pattern change width of the column selected from the pixel FPN is provided at the noise level of 15 to 35, the FPN of the selected column may be sampled by 6 (or less than 6) bits, and in this case, the number of bits of the FPN template may be 2,880.

When the pixel FPN is used according to the method based upon the two-dimensional matrix, the pixel FPN in a two-dimensional matrix form transmitted to the trust zone of the device may be sampled according to a predetermined bit rate and may be stored in the trust zone. When the pixel FPN arranged in a two-dimensional manner is sampled, the number of sampled bits may be unnecessarily big so a bit rate that is less than the sampling bit rate when one row or column is selected may be used. For example, the pixel FPN with the size of 640×480 may be sampled by 4 bits, and the number of the sampled bits of the pixel FPN may be 1,228,800.

As described, the FPN template and the FPN key may be generated by using column FPN or pixel FPN according to an embodiment, and the device may be certified by using the generated FPN template and the FPN key. For example, when a user of a mobile device including an image sensor tries to receive a service limited to a specific terminal (e.g., a terminal designated service of a financial institution), an FPN template may be used for the user to prove that the user's mobile device is registered to the financial institution. Further, the FPN template or the FPN key, according to an embodiment, has a very low possibility of reproduction or forgery compared to the number (e.g., an ID of a USIM, or IMEI/IMSI) randomly assigned to the mobile device after the mobile device is manufactured. A method for using an FPN template and an FPN key, according to an embodiment, will now be described in detail.

Figure 17:
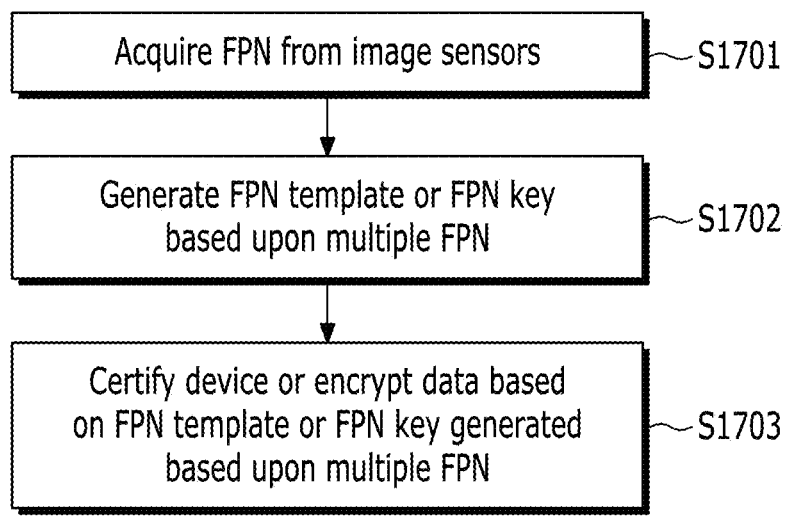
FIG. 17 shows a flowchart of a method for certifying a device using an FPN template or an FPN key, according to an embodiment.

FIG. 17 shows a flowchart of a method for certifying a device using an FPN template or an FPN key, according to an embodiment. When a mobile device or a robot includes a plurality of image sensors, FPN information is acquired from the image sensors in operation S1701, and an FPN template or an FPN key is generated based upon information on a plurality of FPN in operation S1702. Random noise is removed from the initially acquired FPN when the FPN template is generated to acquire high verification reliability.

An FPN template and an FPN key may be generated for the column FPN or pixel FPN acquired from each image sensor, and a plurality of FPN templates and a plurality of FPN keys may be used.

In another way, column FPN may be acquired from a plurality of image sensors and respective column FPN of the image sensors may be combined. In this instance, the respective column FPN may be combined by connecting the column FPN together or adding the FPN values of the same column number. Alternatively, the column FPN acquired from a plurality of image sensors may be combined by sampling with a predetermined bit rate and applying a bit operation such as AND, OR, or XOR to the sampled result.

In a different manner, pixel FPN may be acquired by a plurality of image sensors and the respective pixel FPN of the image sensors may be combined. The size of the two-dimensional arrangement of the pixel FPN acquired from each image sensor may be different, and in this case, small pixel FPN may be added to large pixel FPN.

When the column FPN or pixel FPN acquired from a plurality of image sensors are combined according to the above-noted method, an FPN template and an FPN key may be generated based upon the combined FPN information. The device may be certified or the digital data may be encrypted through the FPN template or FPN key generated based on a plurality of FPN in operation S1703.

Figure 18:
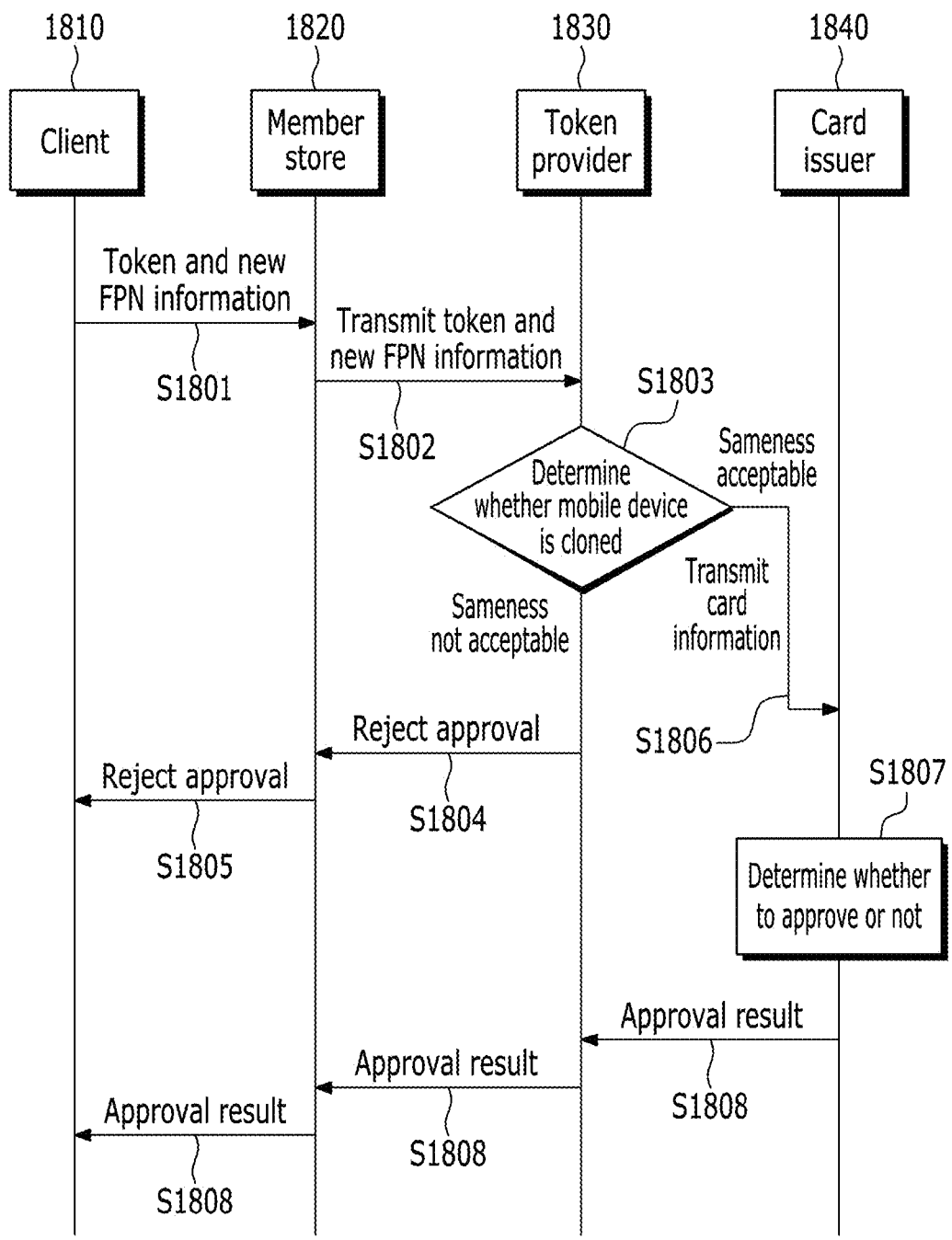
FIG. 18 shows a flowchart of a mobile paying method using FPN information, according to an embodiment.

FIG. 18 shows a flowchart of a mobile paying method using FPN information according to an embodiment.

According to an embodiment, when a mobile payment is performed, a token provider may use FPN information (FPN template or FPN key) to determine whether the mobile payment is performed a true mobile device user.

Referring to FIG. 18, in operation S1801, the mobile device user (i.e., client) 1810 begins a mobile payment by using a token generated based upon card information and FPN information. The client 1810 may newly measure FPN to acquire the FPN and may generate measured FPN information based on the measured FPN when starting the mobile payment. The client 1810 transmits a token, payment information, and measured FPN information to a card member store 1820, such as a restaurant or a shop. A process for the client 1810 to submit the token, payment information, and measured FPN information to the member store 1820 may be a request for approval of a mobile transaction.

When receiving the token, payment information, and payment FPN information from the client 1810, the member store 1820 transmits the token, payment information, and payment FPN information to the token provider in operation S1802. For example, a card buying company may relay tokens, approval requests, and approval results between the member store 1820 and a token provider 1830.

In operation S1803, the token provider 1830 may compare FPN information corresponding to the token provided by the member store 1820 with stored/measured FPN information. That is, the token provider 1830 may verify the sameness of FPN information corresponding to the token and measured FPN information to determine whether the mobile device used for the mobile payment is duplicated. Alternatively, a card issuer 1840 may determine whether the mobile device used for the mobile payment is duplicated. The transmitted measured FPN information may be encrypted and transmitted between the user terminal and the token provider 1830 or the card issuer 1840 and may be decoded at the time of comparison, thereby preventing exposure during an intermediate process.

When the measured FPN information used for the mobile payment is determined to be not the same as the FPN information corresponding to the token (e.g., when the mobile device is determined to be duplicated), the token provider 1830 may report a payment refusal to the member store 1820 in operation S1804 and the payment refusal may be transmitted to the mobile device of the client 1810 by the member store 1820 in operation S1805.

However, when measured FPN information of the mobile device used for the mobile payment is accepted, or determined to be the same as FPN information corresponding to the token, the token provider 1830 transmits card information corresponding to the token to the card issuer 1840 in operation S1806. Thereafter, the card issuer 1840 determines whether to approve the mobile payment based on card information and payment information in operation S1807. When an approval result of the card issuer 1840 is transmitted to the mobile device of the client 1810 through the token provider 1830 and the member store 1820 in operation S1808, the mobile payment may be completed.

According to an embodiment, the token provider 1830 for providing a token used for the mobile payment may compare FPN information corresponding to the token and measured FPN information newly generated when the mobile payment is performed, to determine whether the mobile device used for the mobile payment is duplicated and protect the payment.

Figure 19:
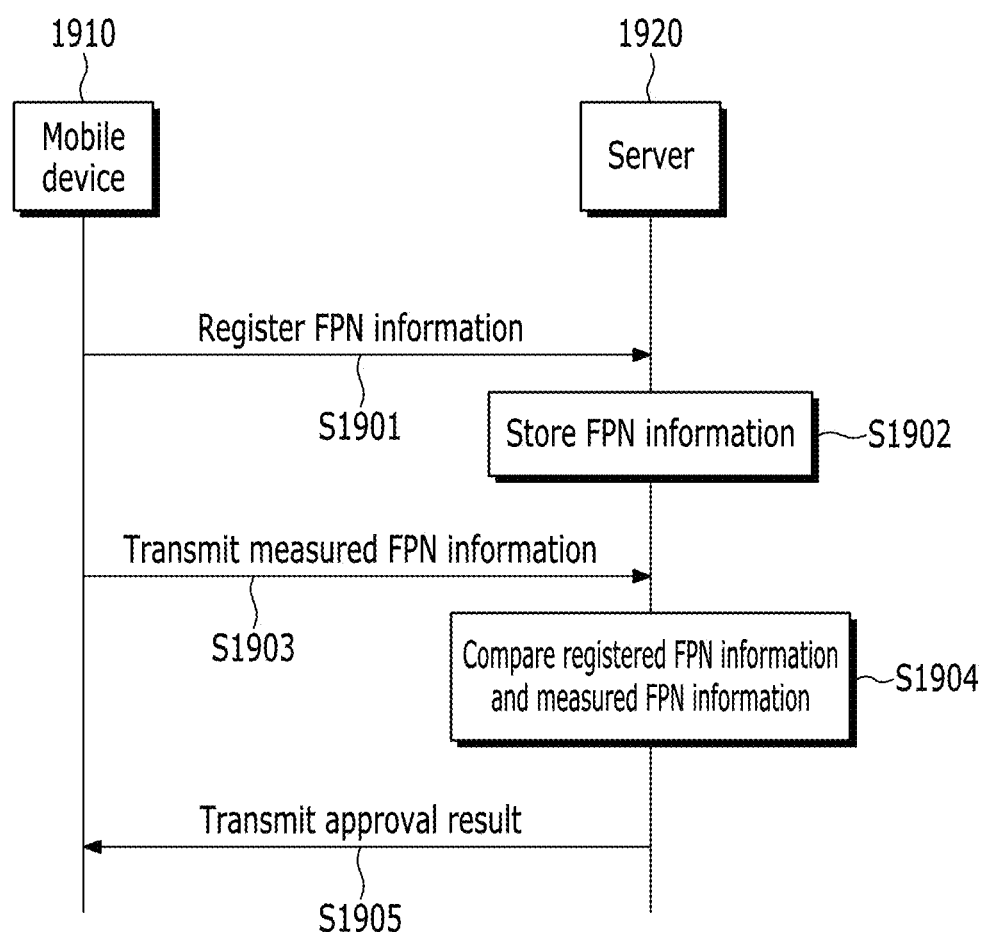
FIG. 19 shows a flowchart of a method for using a mobile device as a certifying means using FPN information, according to an embodiment.

FIG. 19 shows a flowchart of a method for using a mobile device as a certifying means using FPN information, according to an embodiment.

According to an embodiment, a user of a mobile device 1910 may use the mobile device 1910 as a certification tool when accessing a financial institution or a settlement institution through the mobile device 1910. Web sites may include web sites for financial institutions, settlement institutions, government organizations, and online shopping malls, and the user may perform an online banking, online administrative work, and online transactions by using the mobile device 1910 to interact with such web sites.

In operation S1901, the user of the mobile device 1910 transmits FPN information (e.g., FPN template and FPN key) of the mobile device 1910 to a server 1920, such as a server of a financial institution or a settlement institution through a communicator (not shown) of the mobile device 1910. The communicator of the mobile device 1910 may be hardware connected to the controller and the trust zone to transmit and receive radio signals to/from the server 1920. FPN information of the mobile device 1910 provided by the mobile device 1910 is stored in the server 1920 such as a financial institution or a settlement institution in operation S1902. In this instance, random noise may be removed from the initially acquired FPN to provide high verification reliability.

In operation S1903, the user of the mobile device 1910 generates FPN information when performing an online task, and transmits measured FPN information to the server 1920 through a communicator of the mobile device 1910. The server 1920 compares registered FPN information with the newly received, measured FPN information in operation S1904 to determine whether to approve the online task, and transmits an approval result to the mobile device 1910 in operation S1905. That is, when the registered FPN information and the measured FPN information are accepted as, or determined to be, the same, the online task of the user may be approved. Thus, FPN information of the mobile device 1910 may be used as means for certifying the user of the mobile device 1910, according to an embodiment.

When a PC designated service is used for the online task for a web site, a web cam included in the PC may be used as a certifying means. For example, when the user of the mobile device connects the mobile device to the PC to certify the server such as a financial institute or a settlement institute, a combination of FPN (first FPN) acquired from the image sensor of the mobile device and FPN (second FPN) acquired from the web cam of the PC may be used as a means for certifying the server such as a financial institution or a settlement institution. For example, the method described with reference to FIG. 17 may be used for the combination of the first FPN and the second FPN.

Figure 20:
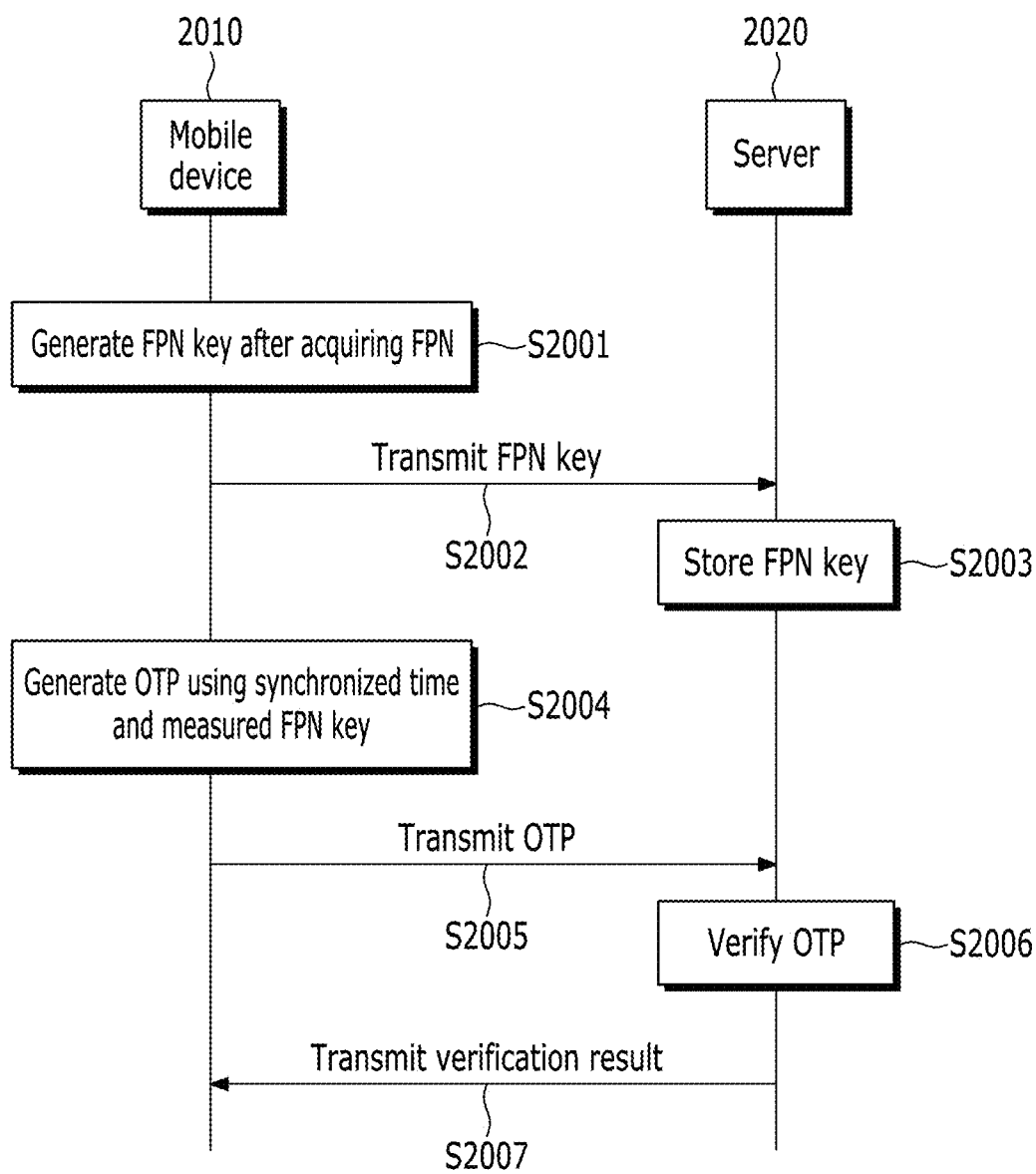
FIG. 20 shows a flowchart of a method for generating a once usable password using an FPN template or an FPN key, according to an embodiment.

FIG. 20 shows a flowchart of a method for generating a one-time usable password using an FPN template or an FPN key, according to an embodiment. According to an embodiment, when accessing a server such of a financial institution or a settlement institution, for example, by using a mobile device 2010, a user of the mobile device 2010 may use a one-time password (OTP) generated by use of the mobile device 2010.

Referring to FIG. 20, in operation S2001, FPN of the mobile device 2010 is acquired from the mobile device 2010, and an FPN key ($k_O$) is generated based upon the acquired FPN. The FPN key ($k_O$) may be generated based on the FPN of which verification reliability is provided by removing random noise. In operation S2002, the FPN key ($k_O$) is transmitted to the server 2020 of a financial institution or a settlement institution, for example, through a communicator (not shown) of the mobile device 2010. The communicator of the mobile device 2010 may be connected to the controller and the trust zone to transmit and receive radio signals to/from the server 2020. The FPN key ($k_O$) is stored in the server 2020 in operation S2003.

In operation S2004, the user accesses a web site of the financial institution or the settlement institution, for example, through the mobile device 2010 and generates an OTP for using the web site. The OTP may be generated by using the FPN key ($k_r$) generated based on the time synchronized between the mobile device and the server and the FPN newly measured from the mobile device. That is, the conventional OTP uses a serial number of an OTP token, and, according to an embodiment, the user of the mobile device 2010 may use the FPN key ($k_r$) generated based on the FPN measured from the image sensor of the mobile device 2010 instead of the serial number of the OTP token. Therefore, the user of the mobile device 2010 may generate the OTP without an additional OTP token and may use the OTP to conduct the financial transaction. The mobile device 2010 transmits the generated OTP to the server 2020 through a communicator in operation S2005.

In operation S2006, the server 2020 compares the OTP (generated by using the FPN key ($k_r$) and transmitted by the mobile device 2010 with the OTP generated based on the stored FPN key ($k_O$) to verify whether the FPN key ($k_r$) is the same as the stored FPN key ($k_O$). The server 2020 transmits a verification result to the mobile device 2010 in operation S2007.

In a method for generating an OTP according to another embodiment, a process for the mobile device 2010 to perform a verification using FPN may be performed before the OTP is generated. For example, when a request for generating an OTP required for using the web site is generated, the mobile device 2010 newly measures FPN and compares the measured FPN and the stored FPN. When the measured FPN is determined to be the same as the stored FPN, the mobile device 2010 uses synchronized time information and stored FPN to generate an OTP. The mobile device 2010 of the user then transmits the generated OTP to the server 2020 through a communicator. Upon receiving the OTP generated by the mobile device 2010, the server 2020 verifies the OTP and transmits a verification result to the mobile device 2010.

Figure 21:
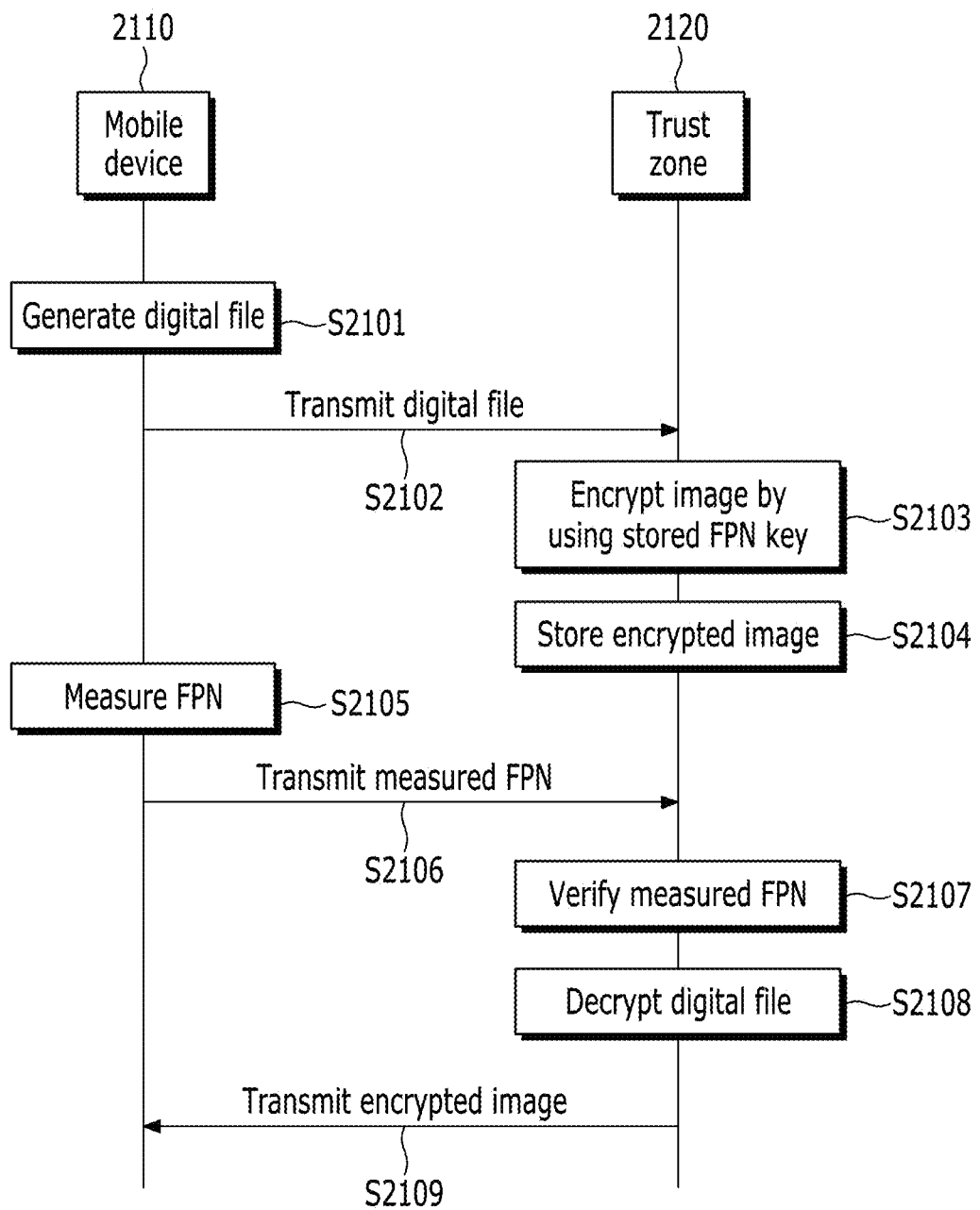
FIG. 21 shows a flowchart of a method for encrypting a digital file generated by a device by using an FPN key, according to an embodiment.

FIG. 21 shows a flowchart of a method for encrypting a digital file generated by a device by using an FPN key, according to an embodiment.

Referring to FIG. 21, a digital file is generated by a device 2110 including an image sensor in operation S2101. The digital file may be an image file or a video file generated by the image sensor. The digital file is transmitted to the trust zone 2120 of the device 2110 in operation S2102. The trust zone 2120 of the device 2110 encrypts the digital file based on the stored FPN key ($k_O$) in operation S2103 and stores the encrypted digital file in operation S2104. The encrypted digital file may be stored inside or outside the trust zone 2120. The trust zone 2120 may convert the stored FPN key ($k_O$) into a hash key by using a hash function, and may encrypt the digital file by using the hash key and an advanced encryption standard (AES) function. When the stored FPN key ($k_0$) is generated, random noise is removed from the initially acquired FPN to provide high verification reliability.

In this instance, an execution of the encrypted digital file requires an FPN key so the encrypted digital file may be used for the device by which the digital file is generated. For example, when a request for executing a digital file is generated to the device 2110, the mobile device 2110 measures FPN in operation S2105 and transmits the measured FPN to the trust zone 2120 in operation S2106. In operation S2107, the trust zone 2120 verifies the FPN provided by the mobile device 2110. For example, the trust zone 2120 may newly generate an FPN key ($k_r$) based on the transmitted FPN, and may compare the newly generated FPN key ($k_r$) with the stored FPN key, thereby verifying the measured FPN. That is, the mobile device 2110 having transmitted the measured FPN may be verified by verifying the measured FPN. The trust zone 2120 uses the stored FPN key to decode the encrypted digital file in operation S2108. That is, the digital file may be decoded when the sameness between the stored FPN and the measured FPN or the sameness between the FPN key ($k_0$) used when the digital file is encrypted and the newly generated FPN key ($k_r$) is accepted. In another way, when the digital file is encrypted based on the hash key (i.e., the stored hash key) converted based upon the FPN key, the digital file may be decoded based on the stored hash key when the reliability of the mobile device 2010 is confirmed through verification on the hash key converted from the newly generated FPN key.

According to an embodiment, as described above, the digital file generated by the device may be encrypted based on the stored FPN key ($k_0$), and the encrypted digital file may be decoded based on the stored FPN key after the newly generated FPN key ($k_r$) is verified when the digital file is requested to be executed. Therefore, the digital file may be executed when the sameness between the stored FPN key ($k_0$) and the newly generated FPN key ($k_r$) is confirmed.

Figure 22:
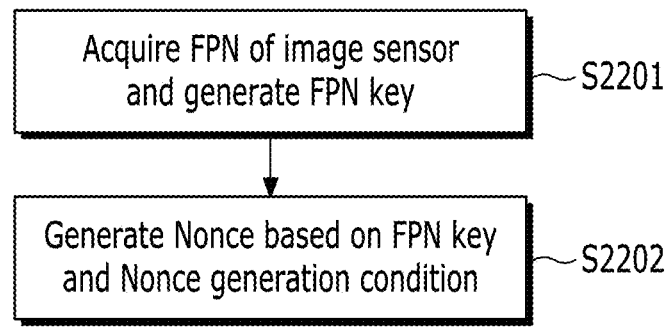
FIG. 22 shows a flowchart of a method for generating a password that may be used and discarded, according to an embodiment.

FIG. 22 shows a flowchart of a method for generating a password that may be used and discarded, according to an embodiment. According to an embodiment, a number to be used just once (Nonce) may be generated based on the FPN key generated from an image sensor of a device and a hash function.

Referring to FIG. 22, in operation S2201, an FPN key is generated based on FPN initially acquired from an image sensor of a device. Random noise may be removed from the initially acquired FPN to provide high verification reliability. The device of the user may receive information on a generation condition of the Nonce from an external device. Alternatively, the generation condition of the Nonce may be previously stored in the user's device after consultation with a place where the password will be used.

In operation S2202, the user's device (or the external device) may generate a Nonce based on the FPN key and the generation condition of the Nonce. Calculation of the Nonce may require much time depending on the level of difficulty of the generation condition of the Nonce, so the Nonce may be calculated in advance by using a parallel processing by a manufacturer of the device or it may be calculated by using an idle resource of the device.

The generation condition of the Nonce may be information on a pattern of a result given when the FPN key and the Nonce are combined and the hash function is applied. For example, Equation 13, shown below, expresses a result given by applying a secure hash algorithm (SHA) that is a hash function to the FPN key ($k_0$). In Equation 13, 18, 21, 20, 21, 23, 20, 18, 18, 21, 22, 23, 22, . . . , 26, 26, 29, 30, 31 is used as an example of the FPN key ($k_0$).

$$\text{sha}(k°) = 469b6ebac17a858ad56e07fd1e05ad7a2\\6c597fe08fe5deaf317dd841e9788fb \quad \text{(Equation 13)}$$

In Equation 13, as an example of the hash function, the SHA-256 is applied to the FPN key, and a 64-bit hexadecimal (or 256 bits as a decimal) is arranged as an output of the SHA-256. Here, when the hash function is applied to a combination of the FPN key and a specific number, its output may have a constant pattern, and the pattern may become the generation condition of the Nonce. Equation 14, shown below, expresses an output of the hash function (SHA-256) for the combination of the FPN key and a specific number.

(Equation 14)

$$\text{sha}(k° + 1) = 6b63251e78caa911d166a753d9427065b972513f991f51e104d6e5b8df8fc8f6$$
$$\ldots \quad \ldots$$
$$\text{sha}(k° + 282875) = 000003852a2aeb83f526e6a9eff3aef386715d36d47d8a40114e22be791132c5$$
$$\text{sha}(k° + 1916066) = 00000203d58a4b1028de00b3fe9e468a83f397df6d353dcb1b5e59d7194b1ae9$$
$$\text{sha}(k° + 2812069) = 000009264d3512db7e7ebbfd25dddf84fb43f9f70c6f58ef62e5f59b4bf83c26$$

Referring to Equation 14, when the hash function is applied to the combination of the FPN key and the number "1," its output does not show a constant pattern, and when the hash function is applied to the combination of the FPN key and the number "282875," "1916066," or "2812069," first five digits of the output of the hash function are 0's. That is, when the generation condition of the Nonce relates to the pattern of the output of the hash function, the Nonce may be generated so that the output of the hash function may be given with a predetermined pattern. The output pattern of the hash function SHA-256 may include five 0's at the foremost part, and as expressed in Equation 14, the numbers "282875," "1916066," and "2812069" may be determined to be the Nonce. In this instance, the level of difficulty of the Nonce may be determined by controlling the number of 0's or characteristic patterns (when the number increases, the level of difficulty increases and the calculation time increases). In a like manner of an embodiment, bilateral certification may be performed through the Nonce without transmission of the FPN value measured by a device. That is, a fact that it is difficult to calculate the Nonce but it is easy to verify the Nonce may be used.

A security of a group configured with a plurality of devices including an image sensor may be maintained by using the Nonce generated, according to an embodiment. For example, the output of the hash function for the combination of the respective FPN keys of a plurality of devices included in the group and the Nonce is set to have a predetermined pattern. Equation 15 expresses an output of a hash function for a combination of an FPN key of each device included in a group and a Nonce.

$$H1 = sha(strcat(k°_{user1}, k°_{user2}, k°_{user3}, \ldots, k°_{user\_n}, num2str(nonce))) \quad \text{(Equation 15)}$$

Therefore, when an image sensor of one device included in the group is duplicated, H1 that is a pattern of a predetermined group may not be output through an FPN key acquired from an image sensor that is suspected to be cloned.

The above-noted group security method may be applied to a plurality of groups. For example, when a hash function result (a first hash output) of a first group from among a plurality of groups is output, a hash function result for a combination of the first hash output, the FPN key of the device included in a second group, and the Nonce may be output. The hash function output in this case is referred to as a second hash output. A previous hash function output may be sequentially used as a hash function input for a next group to sequentially determine whether respective device groups are duplicated. That is, according to an embodiment, it may be easily determined whether one of a plurality of devices is duplicated by using an FPN key of a plurality of devices manufactured in a like manner.

One or more embodiments disclosed herein may prevent the physical cloning of device, may guarantee uniqueness and unclonability of devices, may use unpredictability, may have robustness, and/or may have ease of measurement, thereby overcoming hardware failings of previous computing technologies for identifying devices.

The apparatuses, units, modules, devices, and other components illustrated in FIGS. 1, 2A, 3A, 4, 5A, 6A, 7A, 8A and 18-21 (e.g., the image sensor 100, the pixel unit 110, the row decoder 120, the FPN remover 130, the ADC 140, the column decoder 150, the controller 160, the trust zones 170 and 2120, the pixel circuits 200 and 800, the PGA circuit 300, the digital CDS circuit 400, the analog CDS circuits 500, 600 and 700, the member store 1820, the token provider 1830, the card issuer 1840, the mobile devices 1910, 2010 and 2110, and the servers 1920 and 2020) that perform the operations described herein with respect to FIGS. 1-22 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-22. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 11, 13 and 17-22 that perform the operations described herein with respect to FIGS. 1-22 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A mobile device method for certifying the mobile device, the method comprising:
generating first fixed pattern noise (FPN) information based on column FPN of an image sensor included in the mobile device; and
controlling the mobile device to perform a certification by using the first FPN information,
wherein the generating of the first FPN information comprises sampling a bit of the column FPN according to a predetermined sampling rate
which is determined based on a pattern changing degree of the column FPN, and generating the first FPN information based on the sampled bit.

2. The method of claim 1, wherein the generating of the first FPN information further comprises:
reading the column FPN from a double sampling circuit of the image sensor.

3. The method of claim 2, wherein the reading of the column FPN from the double sampling circuit comprises:
reading a difference between a pixel voltage of pixels of the image sensor and a reference voltage of the double sampling circuit.

4. The method of claim 1, wherein the generating of the first FPN information further comprises:
reading the column FPN from an ADC circuit of the image sensor.

5. The method of claim 1, wherein the generating of the first FPN information further comprises:
selecting at least one row from a matrix arrangement of pixels of the image sensor,
reading column FPN of the at least one row from among the column FPN of the image sensor, and
generating the first FPN information based on the column FPN of the at least one row.

6. The method of claim 5, wherein the reading of the column FPN of the at least one row comprises randomly selecting and reading column FPN from among the column FPN of the at least one row.

7. The method of claim 1, wherein the generating of the first FPN information further comprises:
selecting part of bits of the column FPN; and
generating the first FPN information based on the selected part of the bits.

8. The method of claim 1, further comprising storing the first FPN information in a secure element of the mobile device or an external device.

9. The method of claim 8, wherein the performing of the certification comprises:
generating second FPN information based on second column FPN of the image sensor; and
comparing the first FPN information and the second FPN information.

10. The method of claim 9, wherein the comparing of the first FPN information and the second FPN information comprises:
calculating a vector distance between a first vector of the first FPN information and a second vector of the second FPN information; and
performing the certification based on the vector distance.

11. The method of claim 9, wherein:
the storing of the first FPN information comprises storing the first FPN information in the external device; and
the external device is a server of a financial institution or a server of a settlement institution.

12. The method of claim 1, wherein:
the generating of the first FPN information further comprises generating the first FPN information based on the column FPN of the image sensor and column FPN of another image sensor from among a plurality of image sensors of the mobile device.

13. The method of claim 1, wherein the controlling of the mobile device to perform the certification comprises controlling the mobile device to encrypt data of the mobile device by using the first FPN information.

14. The method of claim 1, wherein the performing of the certification comprises:
transmitting the first FPN information to a server of a financial institution or a server of a settlement institution; and
controlling the mobile device, in response to a user of the mobile device accessing the server of the financial institution or the server of the settlement institution, to transmit an access time and a password generated based on the first FPN information to the server of the financial institution or the server of the settlement institution.

15. A mobile device, comprising:
at least one image sensor; and
a trust zone configured to generate first fixed pattern noise (FPN) information based on sampling of a bit of column FPN of the at least one image sensor, and to perform a certification by using the first FPN information,
wherein the sampling of the bit is performed according to a predetermined sampling rate which is determined based on a pattern changing degree of the column FPN.

16. The mobile device of claim 15, wherein the mobile device is configured to store the first FPN information in the trust zone.

17. The mobile device of claim 15, wherein:
the image sensor comprises a double sampling circuit and pixels; and
the trust zone is further configured to generate the first FPN information by reading the column FPN from the double sampling circuit.

18. The mobile device of claim 15, further comprising a controller configured to read a difference between a pixel voltage of the pixels and a reference voltage of the double sampling circuit.

19. The mobile device of claim 18, wherein:
the image sensor comprises pixels arranged in a matrix;
the controller is further configured to read, from at least one row in the matrix, column FPN from among the column FPN of the image sensor; and
the trust zone is further configured to generate the first FPN information based on the column FPN read from the at least one row.

20. The mobile device of claim 19, wherein the controller is further configured to randomly select and read the column FPN from the at least one row.

21. The mobile device of claim 18, wherein:
the controller is further configured to transmit part of bits of the column FPN to the trust zone; and
the trust zone is further configured to generate the first FPN information based on the selected part of the bits.

22. The mobile device of claim 18, wherein the trust zone is further configured to generate second FPN information based on second column FPN of the at least one image sensor, and to compare the first FPN information and the second FPN information.

23. The mobile device of claim 22, wherein the trust zone is further configured to calculate a vector distance between a first vector of the first FPN information and a second vector of the second FPN information, and to perform the certification based on the vector distance.

24. The mobile device of claim 22, wherein the mobile device is configured to store the first FPN information in a server of a financial institution or a server of a settlement institution.

25. The mobile device of claim 15, wherein:
the image sensor comprises an analog to digital conversion (ADC) circuit and pixels; and
the trust zone is further configured to generate the first FPN information by reading the column FPN from the ADC circuit.

26. The mobile device of claim 15, wherein the trust zone is further configured to generate the first FPN information based on column FPN of a first image sensor from among the at least one image sensor and column FPN of a second image sensor from among the at least one image sensor.

27. The mobile device of claim 15, wherein the trust zone is further configured to encrypt data of the mobile device by using the first FPN information.

28. The mobile device of claim 15, further comprising:
a communicator configured to transmit the first FPN information to a server of a financial institution or a server of a settlement institution,
wherein the trust zone is further configured to generate a password based on an access time and the first FPN information in response to a user of the mobile device accessing the server of the financial institution or the server of the settlement institution, and to transmit the password to the server of the financial institute or the server of the settlement institution.

29. A mobile device, comprising:
an image sensor; and
a trust zone configured to generate first fixed pattern noise (FPN) template based on sampling of a bit of column FPN of the image sensor, and to perform a certification by comparing the generated FPN template with a stored FPN template,
wherein the sampling of the bit is performed according to a predetermined sampling rate which is determined based on a pattern charging degree of the column FPN.

30. The mobile device of claim 29, wherein the mobile device is configured to certify that the mobile device is not a cloned device in response to a determination of an acceptable sameness between the generated FPN template and the stored FPN template.

31. The mobile device of claim 29, wherein the stored FPN template is stored in the trust zone or an external device.

32. The mobile device of claim 29, where in the stored FPN template is based on initial FPN of the image sensor obtained prior to the column FPN.

* * * * *